(12) United States Patent
Rhee

(10) Patent No.: US 9,347,428 B2
(45) Date of Patent: May 24, 2016

(54) WIND ENERGY ELECTRICITY GENERATOR FOR LOW WIND VELOCITY

(75) Inventor: Yeong Won Rhee, Goyang-si (KR)

(73) Assignee: JI EUN LEE, Gyeonggi-Do (KR)

(*) Notice: Subject to any disclaimer, the term of this patent is extended or adjusted under 35 U.S.C. 154(b) by 27 days.

(21) Appl. No.: 14/373,585

(22) PCT Filed: Jul. 2, 2012

(86) PCT No.: PCT/KR2012/005233
§ 371 (c)(1),
(2), (4) Date: Jul. 21, 2014

(87) PCT Pub. No.: WO2013/115441
PCT Pub. Date: Aug. 8, 2013

(65) Prior Publication Data
US 2014/0367972 A1    Dec. 18, 2014

(30) Foreign Application Priority Data
Feb. 3, 2012 (KR) .......................... 10-2012-0011151

(51) Int. Cl.
*F03D 9/00* (2016.01)
*H02P 9/04* (2006.01)
(Continued)

(52) U.S. Cl.
CPC *F03D 3/02* (2013.01); *F03D 3/005* (2013.01); *F03D 9/001* (2013.01); *F03D 9/002* (2013.01); *F03D 9/028* (2013.01); *F05B 2260/42* (2013.01); *Y02E 10/72* (2013.01); *Y02E 60/15* (2013.01)

(58) Field of Classification Search
USPC .................................................. 290/55, 44
See application file for complete search history.

(56) References Cited

U.S. PATENT DOCUMENTS 1,100,332 A * 6/1914 Smith ................... F04D 29/281
    416/175
1,697,574 A * 1/1929 Savonius ................ F03D 3/007
    416/110
(Continued)

FOREIGN PATENT DOCUMENTS

KR    1020020005538    1/2002
KR    1020100081892    7/2010
KR    1020100101287    9/2010

OTHER PUBLICATIONS

Written Opinion of the International Searching Authority dated Jan. 31, 2013, issued in International Patent Application No. PCT/KR2012/005233 filed Jul. 2, 2012 which is the corresponding International Application to the present U.S. application.

*Primary Examiner* — Pedro J Cuevas
(74) *Attorney, Agent, or Firm* — Porzio, Bromberg & Newman, P.C.

(57) ABSTRACT

According to the present invention, use is made of a drag-type blade in which the blade is constituted vertically and in multiple blocks while the inside thereof is formed so as to have an overlapping region, thereby achieving an aerodynamic characteristic whereby there is a large initial torque for rotating the blade of the wind energy electricity generator from the stationary state such that the rotational moment is increased. On the outside thereof, use is made of airfoil-type blades, thereby obtaining rapid rotational acceleration with tip-speed ratio no less than 1.0 and effecting wind energy electricity generation even with a low wind velocity regardless of the wind direction, and thus the present invention is economic and can be installed at low cost unaffected by place or position and is environmentally friendly while nevertheless being able to effect highly efficient wind energy electricity generation.

20 Claims, 23 Drawing Sheets

(51) Int. Cl.
*F03D 3/02* (2006.01)
*F03D 9/02* (2006.01)
*F03D 3/00* (2006.01)

(56) References Cited

U.S. PATENT DOCUMENTS

| | | | | |
|---|---|---|---|---|
| 3,918,839 A * | 11/1975 | Blackwell | F03D 3/061 | 416/175 |
| 4,449,053 A * | 5/1984 | Kutcher | F03D 11/0008 | 290/44 |
| 5,171,127 A * | 12/1992 | Feldman | F03D 3/062 | 416/119 |
| 5,183,386 A * | 2/1993 | Feldman | F03D 3/062 | 415/4.2 |
| 5,203,672 A * | 4/1993 | Wolf | F03D 3/062 | 415/2.1 |
| 5,252,029 A * | 10/1993 | Barnes | F03D 11/04 | 416/132 B |
| 5,405,246 A * | 4/1995 | Goldberg | F03D 3/061 | 416/227 A |
| 6,808,366 B2 * | 10/2004 | Sikes | F03D 3/02 | 415/60 |
| 6,910,873 B2 * | 6/2005 | Kaliski | F03D 3/005 | 416/119 |
| 7,156,609 B2 * | 1/2007 | Palley | B23P 15/04 | 29/889.21 |
| 7,948,111 B2 * | 5/2011 | Nigam | F03D 3/005 | 248/125.7 |
| 7,988,413 B2 * | 8/2011 | Haar | F03D 3/06 | 290/55 |
| 8,013,464 B2 * | 9/2011 | Stern | F03D 3/005 | 290/44 |
| 8,215,913 B2 * | 7/2012 | Lux | F03D 3/065 | 416/195 |
| 8,257,018 B2 * | 9/2012 | Coffey | F03D 3/005 | 290/44 |
| 8,258,647 B2 * | 9/2012 | Haar | F03D 3/06 | 290/44 |
| 8,373,294 B2 * | 2/2013 | Haar | F03D 3/06 | 290/44 |
| 8,376,688 B2 * | 2/2013 | Haar | F03D 3/06 | 415/60 |
| 8,450,872 B2 * | 5/2013 | Huang | F03D 3/005 | 290/44 |
| 8,680,705 B2 * | 3/2014 | Pujol Artigas | F03D 3/062 | 290/55 |
| 8,994,207 B2 * | 3/2015 | Giraldo Orozco | F03D 3/02 | 290/44 |
| 9,267,490 B1 * | 2/2016 | Paquette | F03D 3/005 | |
| 2007/0224029 A1 * | 9/2007 | Yokoi | F03D 3/005 | 415/4.2 |
| 2008/0152492 A1 * | 6/2008 | Fein | F03D 9/007 | 416/9 |
| 2009/0102194 A1 * | 4/2009 | M'Ariza Garcia San Miguel | F03D 3/061 | 290/44 |
| 2009/0317255 A1 * | 12/2009 | Bertony | F03D 3/061 | 416/198 R |
| 2010/0007144 A1 * | 1/2010 | Nigam | F03D 3/005 | 290/44 |
| 2010/0230972 A1 * | 9/2010 | Haar | F03D 3/02 | 290/55 |
| 2010/0295316 A1 * | 11/2010 | Grassman | F03D 3/005 | 290/55 |
| 2010/0296913 A1 * | 11/2010 | Lee | F03D 3/02 | 415/4.2 |
| 2011/0042962 A1 * | 2/2011 | Yoon | F03D 3/061 | 290/55 |
| 2011/0133474 A1 * | 6/2011 | Haar | F03D 3/06 | 290/55 |
| 2011/0142659 A1 * | 6/2011 | Janiuk | F03D 3/061 | 416/223 R |
| 2011/0171033 A1 * | 7/2011 | Hara | F03D 3/065 | 416/223 R |
| 2011/0206526 A1 * | 8/2011 | Roberts | F03D 3/02 | 416/223 R |
| 2011/0255975 A1 * | 10/2011 | Perless | F03D 3/061 | 416/176 |
| 2011/0260455 A1 * | 10/2011 | Haar | F03D 3/06 | 290/44 |
| 2011/0260463 A1 * | 10/2011 | Haar | F03D 3/06 | 290/55 |
| 2011/0262276 A1 * | 10/2011 | Haar | F03D 3/06 | 416/202 |
| 2011/0280708 A1 * | 11/2011 | Cochrane | F03D 3/065 | 415/4.4 |
| 2012/0014795 A1 * | 1/2012 | Blonder | F03D 5/00 | 416/132 B |
| 2012/0128500 A1 * | 5/2012 | Perless | F03D 1/005 | 416/223 R |
| 2012/0201687 A1 * | 8/2012 | Song | F03D 3/061 | 416/227 R |
| 2012/0280510 A1 * | 11/2012 | Hwang | F03D 3/067 | 290/55 |
| 2013/0156585 A1 * | 6/2013 | Mangano | F03D 3/064 | 416/210 R |
| 2013/0183164 A1 * | 7/2013 | Silvert | F03D 3/062 | 416/244 R |
| 2015/0110598 A1 * | 4/2015 | Lee | F03D 7/06 | 415/4.2 |

\* cited by examiner

Figure 2(a)
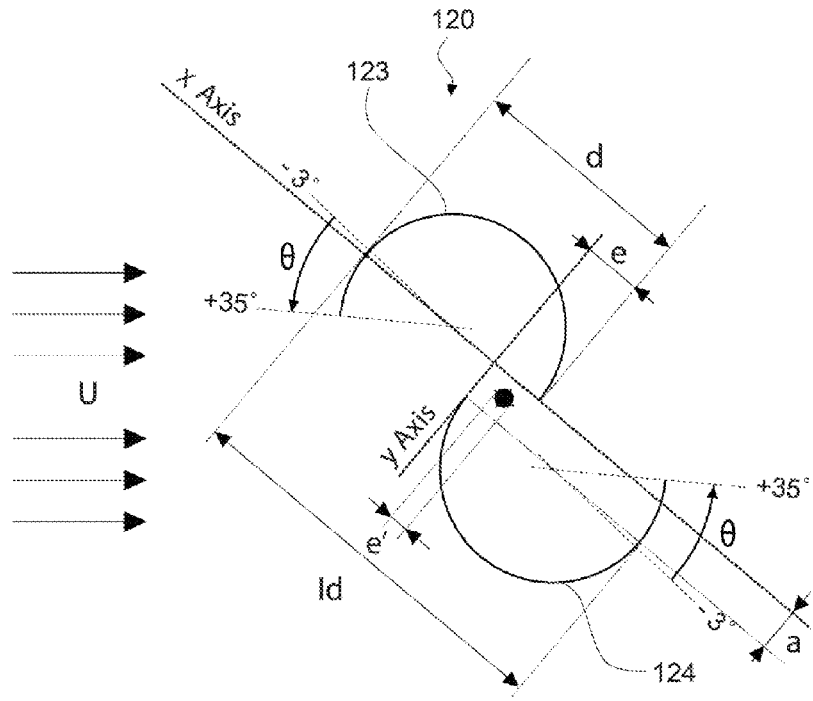
U : Wind direction(Wind of Velocity)
d : Semicircle (the diameter of the drag-type blade's semicircle)
ld : Diameter of the drag-type blade
e' : Central shaft
e : Overlap between semicircles (x Axis)
a : y Axis spacing between semicircles
(e-e')/d : Overlapping regions(Overlap ratio)
θ : Extension angle of semicircle
+ : Central axis
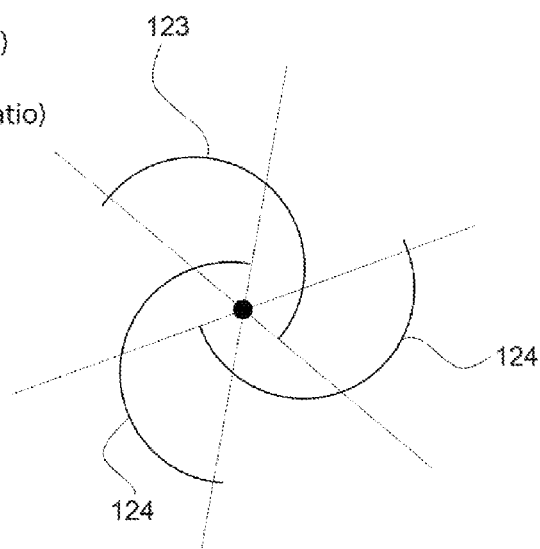

Figure 2(b)
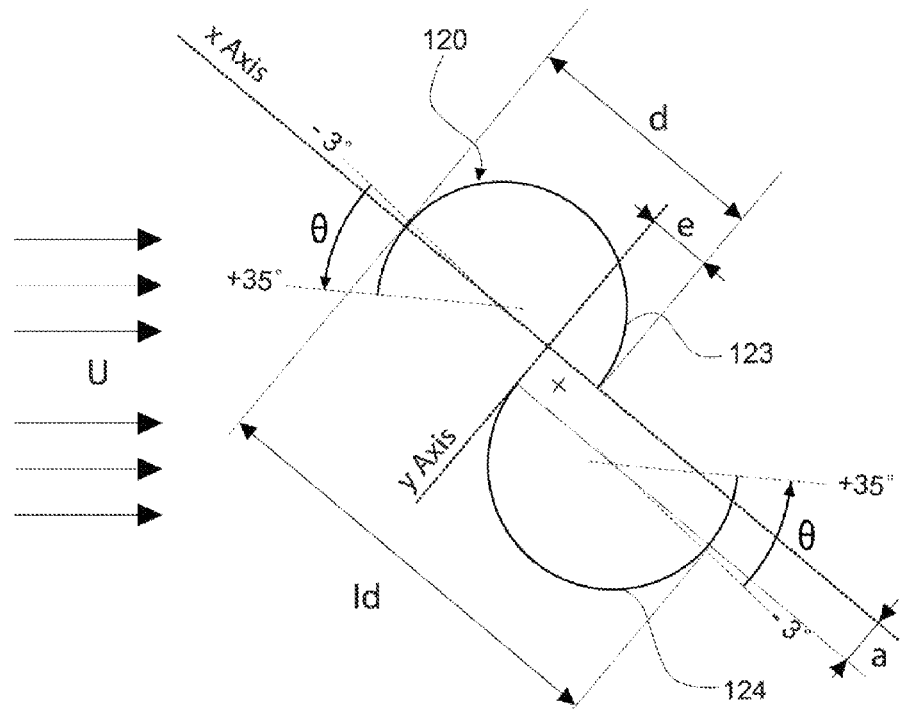
U : Wind direction(Wind of Velocity)
d : Semicircle (the diameter of the drag-type blade's semicircle)
ld : Diameter of the drag-type blade
e : Overlap between semicircles (x Axis)
a : y Axis spacing between semicircles
e/d : Overlapping regions(Overlap ratio)
θ : Extension angle of semicircle
+ : Central axis
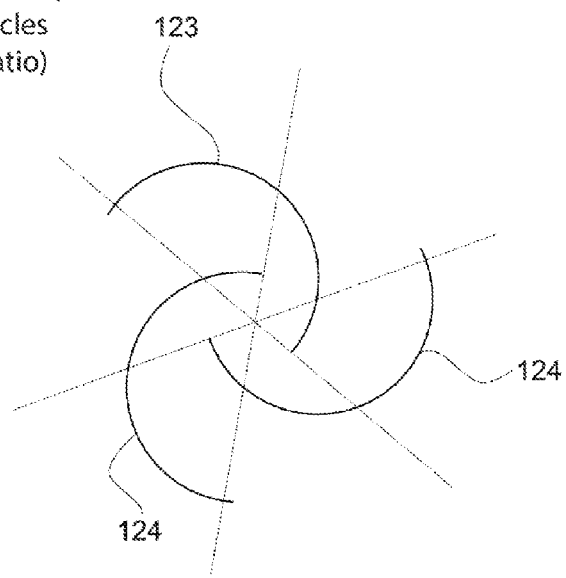

Figure 17
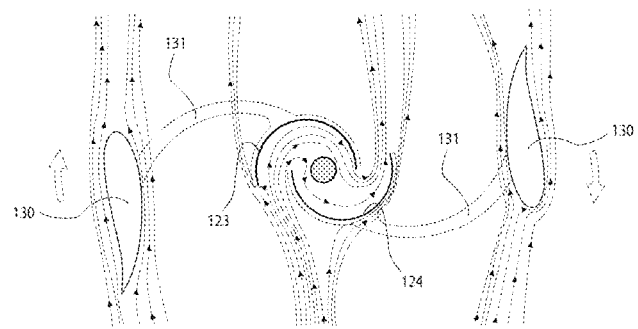
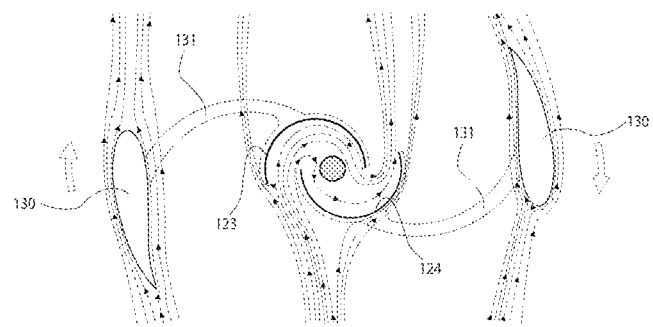

WIND ENERGY ELECTRICITY GENERATOR FOR LOW WIND VELOCITY

THE TECHNOLOGY FIELD

This invention pertains to the wind energy electricity generator for low wind velocity that generates electricity even in the low wind velocity region by increasing the moment of rotation of the blade, maximizing the tip speed ratio at the same time of starting the rotation of the blade and by increasing the efficiency of the rotational power.

THE BACKGROUND TECHNOLOGY

Energy brings countless benefits to us. However since few years ago, abnormal temperature phenomena of earth such as cold weather and heavy snow, heavy rain and drought, landslides, hurricanes, heat waves, etc, are seriously breaking the highest records of earth's history and it is being concluded that the cause of such extreme weather anomaly lies in the global warming phenomenon due to the use of fossil fuels.

Various nations in the world have recognized such reality and are investing a great deal of capital to develop cleaner fuels for the future. Also, along with various efforts to find the unlimited energy to escape from the dependency on fossil fuel, in other words the future energy, researches and developments are thoroughly conducted for finding new energy sources that can replace the oil and the coal in order to resolve the energy issue.

New energy sources that the human should pursue after departing fossil energy includes many types of energies such as the solar energy, the wind power energy, the artificial sunlight, the hydrogen energy, the energy using the sea water, the bio energy. Just as other energies, the wind power draws attentions as a new energy source for the future for its environmental friendly and renewable characteristics and has the advantage of being enabled to generate electricity for 24 hours a day as long as the wind is blowing, while the solar generation is limited by cloudy climates and nighttimes. Since the wind is unlimited and clean natural element, the wind power energy is recognized for its value as an alternative fuel which does not produce air pollutions or dangerous wastes. Although the wind power generation has sufficient possibility as an alternative way of generating power, the wind power generation in the low wind velocity region cannot completely replace the role as the self generator (power generation for self-consumption) or as the effective capacity of resource that react as the spinning reserve for its power generation capacity credit due to the wind variability where the wind suddenly changes directions and due to the wind energy having a low wind speed (2~6 m/sec), thus the development of economical and highly efficient wind energy electricity generator for low wind velocity for distributed power grid system is urgently required.

In case of installing the wind power generator for the rated wind velocity of 12 m/sec in a low wind speed region where the annual average wind velocity is 2~6 m/sec, the system includes either a large generator of excessive capacity of 4 or higher folds or a small to medium generator still having an excessive capacity so the loss of investment is too significant. Since the generation capacity of Vestas in Denmark and other world famous manufacturers are manufacturing their products with the rated wind velocity of 12 m/sec, their products are not productive in the low wind velocity environment.

Furthermore, in the region of low wind velocity, the direction of the wind is not unformed and frequently causes yawing so the efficient generation cannot be achieved.

In the region of low wind velocity where the temperature difference on the ground surface caused by the Sun and the cloud creates the wind, the wind direction changes frequently and the Reynolds number fluctuates excessively. However, it is a burden for the world to give up on the wind power resource because of the world trend of green growth which must utilize the energy from the nature. The current increase of installations of many wind power generators with high capacity in the region of low wind velocity with insufficient starting torque are based on the installation capacity to demonstrate and has a large difference from the actual investment and the amount of generated power. Therefore, such installation is considered as very unfortunate in terms of the economic analysis or the green energy development.

Therefore, the wind power generation technology optimized for the low wind velocity of 2~6 m/sec is seriously required in order to efficiently use the wind power resource.

DESCRIPTION OF THE INVENTION

The Technical Task

This invention is devised to solve the conventional problems and the purpose of this invention is to provide the wind power generation device for low wind velocity that can increase the efficiency of rotational power by maximizing the tip speed ratio at the same time of starting the rotation of the blade by externally installing the airfoil-type blade that can increase the rotational speed, increasing the moment of rotation by forming the overlapping regions between the drag-type blades and installing the drag-type blade that can maximize the starting torque even with small amounts of wind to the inner side.

Means of Solving the Task

To achieve the goal explained above, the wind power generation device for low wind velocity according to one view point of this invention is formed in a long cylindrical rod shape. The central shaft that produces the rotation power is supported in a rotatable style and the cover plate that connects to the above axle has a connecting part in the center in the shape of prolate groove. To increase the moment of rotation, the overlapping regions is formed based on the axle connection part and placed and fixed at the same direction. If the central axis is formed by a shaft, the overlap ratio of the overlapping regions is calculated by dividing the value gained from subtracting the diameter of shaft of the central axis (e') from the X axis spacing (e) where semicircles overlap with the semicircle's diameter (d). And, if the central axis is formed without a shaft since it is supported by drag-type blades, the device becomes characterized with drag-type blades in a shape of semicircular ring formed as the X axis spacing (e) where semicircles overlap is divided by the diameter of the semicircle (d); airfoil-type blades that are connected at the outer peripheral surface of the drag-type blades and maximize the tip speed ratio by rotating uniformly with the drag-type blades; and the generation module located on the extension from the central shaft that produces electricity by receiving the rotational driving force from the central shaft.

By referring to the National Advisory Committee for Aeronautics (NACA) Airfoils Series and NREL (National Renewable Energy Laboratory, U.S. Dept. of Energy) Airfoil Family, using the multi-model test method of Edison style which requires many testing, the scaled models of the drag-type blades for inside and the airfoil-type blades for outside are produced and assembled as shown in the following Table 1 (scaled model of blade).

TABLE 1

| Scaled model of blade (Prototype) Specification | |
|---|---|
| Circumference of the blade | 2.198 m |
| Blade width | 0.7 m |
| Blade height | 0.3 m |
| Blade area (Swept Area) | 0.21 m² |

As shown in Table 2 below, by using the 4.0 m/sec wind tunnel,

TABLE 2

| Wind Tunnel Specification | |
|---|---|
| Dimension | 1.5 m(w) × 1.9 m(h) × 6 m(l) |
| Test Section Dimension | 1.2 m(w) × 0.6 m(h) × 1.5 m(l) |
| Type | Push Type |
| Fan blower | Siroco fan 1.4 kW × 2 |
| Maximum Wind Speed | 4.0 m/sec |

As shown in Table 3 below, the test results on each of TSR (Tip Speed Ratio, $\lambda$), blade rotation RPM and the power coefficient and efficiency were obtained with and without the load on the generator output terminal in the wind speed of 4.0 m/sec by five geometrical parameters.

TABLE 3

| Division | Geometrical Parameters | |
|---|---|---|
| 1 | Angle of extension of the outward end extended from a semicircle ($\theta$) | Drag-Type Blade |
| 2 | Y axis Spacing (a) Ratio between Semicircles | |
| 3 | Overlap Ratio of the Overlapping regions | |
| 4 | Blade Thickness Ratio (Wing Thickness Ratio) | Airfoil-Type Blade |
| 5 | Degree of Angle of Attack | |

TSR (Tip Speed Ratio, $\lambda$, the speed of the blade tip and the wind velocity) required for detail assessment of geometrical parameters in Table 3 is calculated using the following equation:

$$TSR(\lambda) = \frac{R\omega}{V} = \frac{2\pi NR}{60V} \quad \text{[Equation 1]}$$

Where R is the blade's rotation radius, $\omega$ is the rotation angular velocity (rad/s), N is the blade rpm and V is the wind velocity set as 4.0 m/sec.

The calculation for the power coefficient (Cp) is performed by using the following:

$$P = \frac{1}{2}C_P(p\pi R^2 V^3) \quad \text{[Equation 2]}$$

Where P is the output, p is the air density, V is the wind velocity, R is the blade's rotation radius and Cp is the power coefficient. The following Table 4 and Table 8 is the intercomparison Table of geometrical parameters after being retested through detailed classification with each of the resulting condition obtained with the maximum power coefficient (Cp, efficiency) from the five geometrical parameters of Table 3.

The following Table 4 shows the comparison results obtained from the test conducted on the extension angles ($\theta$) of drag-type blade's semicircle at −10°, −5°, −3°, 0°, 3°, 10°, 20°, 30°, 35°, 40° and 50° from the center point.

TABLE 4

| Extension | (No Load) | | (Load) | | | |
|---|---|---|---|---|---|---|
| angles ($\theta$) | RPM | TSR | RPM | TSR | (watt) | $C_p$ |
| −10° | 198 | 1.81 | 168 | 1.53 | 1.62 | 0.201 |
| −5° | 202 | 1.85 | 173 | 1.56 | 1.65 | 0.204 |
| −3° | 206 | 1.89 | 177 | 1.62 | 1.67 | 0.207 |
| 0° | 206 | 1.89 | 177 | 1.62 | 1.67 | 0.206 |
| 3° | 210 | 1.92 | 180 | 1.65 | 1.70 | 0.211 |
| 5° | 211 | 1.93 | 180 | 1.65 | 1.71 | 0.211 |
| 10° | 213 | 1.95 | 182 | 1.67 | 1.74 | 0.216 |
| 20° | 216 | 1.98 | 184 | 1.69 | 1.79 | 0.222 |
| 30° | 221 | 2.02 | 188 | 1.72 | 1.85 | 0.229 |
| 35° | 219 | 2.00 | 187 | 1.71 | 1.81 | 0.224 |
| 40° | 199 | 1.82 | 170 | 1.56 | 1.57 | 0.195 |
| 50° | 188 | 1.72 | 160 | 1.47 | 1.43 | 0.177 |

The following Table 5 shows the comparison results obtained from the test conducted on the Y axis spacing (a) between semicircles of drag-type blades with the radius of semicircles of drag-type blades (d) set as −0.05, 0.00, 0.05, 0.10, 0.20, 0.25 and 0.30 respectively.

TABLE 5

| Y axis | (No Load) | | (Load) | | | |
|---|---|---|---|---|---|---|
| spacing (a) | RPM | TSR | RPM | TSR | (watt) | $C_p$ |
| −0.05 | 216 | 1.98 | 185 | 1.69 | 1.80 | 0.223 |
| 0.00 | 219 | 2.01 | 187 | 1.71 | 1.82 | 0.226 |
| 0.05 | 221 | 2.02 | 188 | 1.72 | 1.85 | 0.229 |
| 0.10 | 216 | 1.98 | 185 | 1.69 | 1.80 | 0.223 |
| 0.20 | 212 | 1.94 | 181 | 1.66 | 1.71 | 0.212 |
| 0.25 | 209 | 1.91 | 179 | 1.64 | 1.69 | 0.210 |
| 0.30 | 207 | 1.90 | 177 | 1.62 | 1.67 | 0.207 |

The following Table 6 shows the comparison results obtained from the test conducted on the overlap ratio of the drag-type blades' overlapping regions set as 0%, 5%, 10%, 13%, 16%, 22%, 25%, 28%, 32%, 34%, 40% and 50% respectively.

TABLE 6

| Overlap ratio in | (No Load) | | (Load) | | | |
|---|---|---|---|---|---|---|
| the overlapping regions | RPM | TSR | RPM | TSR | (watt) | $C_p$ |
| 0% | 174 | 1.59 | 147 | 1.35 | 1.28 | 0.159 |
| 5% | 176 | 1.61 | 150 | 1.37 | 1.32 | 0.164 |
| 10% | 178 | 1.63 | 152 | 1.39 | 1.33 | 0.165 |
| 13% | 203 | 1.86 | 174 | 1.59 | 1.64 | 0.203 |
| 16% | 196 | 1.80 | 167 | 1.53 | 1.52 | 0.188 |
| 22% | 199 | 1.82 | 170 | 1.56 | 1.57 | 0.195 |
| 25% | 221 | 2.02 | 188 | 1.72 | 1.85 | 0.229 |
| 28% | 196 | 1.80 | 167 | 1.53 | 1.52 | 0.188 |
| 32% | 178 | 1.63 | 152 | 1.39 | 1.33 | 0.165 |
| 34% | 176 | 1.61 | 150 | 1.37 | 1.32 | 0.164 |
| 40% | 156 | 1.43 | 132 | 1.21 | 1.11 | 0.138 |
| 50% | 151 | 1.38 | 128 | 1.17 | 1.01 | 0.125 |

The following Table 7 shows the comparison results obtained from the test conducted on the airfoil-type blade's thickness ratio (Wing Thickness Ratio) set as 9.0%, 10.0%, 15.0%, 15.5%, 17.5%, 18.0%, 23.0%, 25.0%, 30.0%, 32.5% and 35.0% respectively.

(Blade thickness ratio(Wing Thickness Ratio)=Wing Thickness/Chord line length)

TABLE 7

| Airfoil-type blade's thickness ratio (Wing Thickness Ratio) | (No Load) | | (Load) | | | |
|---|---|---|---|---|---|---|
| | RPM | TSR | RPM | TSR | Output (watt) | $C_p$ |
| 9.0% | 95 | 0.87 | 79 | 0.72 | 0.49 | 0.061 |
| 10.0% | 99 | 0.91 | 83 | 0.76 | 0.52 | 0.064 |
| 15.0% | 156 | 1.43 | 132 | 1.21 | 1.11 | 0.138 |
| 15.5% | 177 | 1.62 | 151 | 1.38 | 1.32 | 0.164 |
| 17.5% | 190 | 1.74 | 162 | 1.48 | 1.44 | 0.179 |
| 18.0% | 200 | 1.83 | 171 | 1.57 | 1.58 | 0.196 |
| 23.0% | 221 | 2.02 | 188 | 1.72 | 1.85 | 0.229 |
| 25.0% | 214 | 1.96 | 183 | 1.68 | 1.75 | 0.217 |
| 30.0% | 208 | 1.90 | 178 | 1.63 | 1.68 | 0.208 |
| 32.5% | 201 | 1.84 | 172 | 1.58 | 1.58 | 0.196 |
| 35.0% | 183 | 1.68 | 156 | 1.43 | 1.40 | 0.174 |

The following Table 8 shows the comparison results obtained from the test conducted on the airfoil-type blade's angle of attack in the increment of 1° unit between −10° to 30°.

TABLE 8

| Airfoil-type blade's angle of attack | (No Load) | | (Load) | | | |
|---|---|---|---|---|---|---|
| | RPM | TSR | RPM | TSR | Output (watt) | $C_p$ |
| −10° | 33 | 0.30 | 028 | 0.26 | 0.05 | 0.006 |
| −5° | 53 | 0.49 | 045 | 0.41 | 0.17 | 0.021 |
| −4° | 76 | 0.70 | 065 | 060 | 0.30 | 0.037 |
| −3° | 110 | 1.01 | 094 | 0.86 | 0.60 | 0.074 |
| −2° | 146 | 1.34 | 125 | 1.14 | 0.96 | 0.119 |
| −1° | 161 | 1.47 | 138 | 1.26 | 1.17 | 0.145 |
| 0° | 178 | 1.63 | 152 | 1.39 | 1.33 | 0.165 |
| 1° | 184 | 1.69 | 157 | 1.44 | 1.41 | 0.175 |
| 2° | 191 | 1.75 | 163 | 1.49 | 1.45 | 0.180 |
| 3° | 197 | 1.80 | 168 | 1.54 | 1.53 | 0.190 |
| 4° | 200 | 1.83 | 171 | 1.57 | 1.58 | 0.196 |
| 5° | 201 | 1.84 | 172 | 1.58 | 1.58 | 0.196 |
| 6° | 207 | 1.90 | 177 | 1.62 | 1.67 | 0.207 |
| 7° | 212 | 1.94 | 181 | 1.66 | 1.71 | 0.212 |
| 8° | 214 | 1.96 | 183 | 1.68 | 1.75 | 0.217 |
| 9° | 215 | 1.97 | 184 | 1.69 | 1.79 | 0.222 |
| 10° | 216 | 1.98 | 185 | 1.69 | 1.80 | 0.223 |
| 11° | 220 | 2.01 | 188 | 1.72 | 1.83 | 0.227 |
| 12° | 220 | 2.01 | 188 | 1.72 | 1.83 | 0.227 |
| 13° | 221 | 2.02 | 188 | 1.72 | 1.85 | 0.229 |
| 14° | 219 | 2.01 | 187 | 1.71 | 1.81 | 0.224 |
| 15° | 214 | 1.96 | 183 | 1.68 | 1.77 | 0.219 |
| 16° | 213 | 1.95 | 182 | 1.67 | 1.74 | 0.216 |
| 17° | 207 | 1.90 | 177 | 1.62 | 1.68 | 0.208 |
| 18° | 204 | 1.87 | 174 | 1.59 | 1.58 | 0.196 |
| 19° | 198 | 1.81 | 169 | 1.55 | 1.58 | 0.196 |
| 20° | 189 | 1.73 | 162 | 1.48 | 1.43 | 0.177 |
| 21° | 180 | 1.65 | 154 | 1.41 | 1.39 | 0.172 |
| 22° | 177 | 1.62 | 151 | 1.38 | 1.32 | 0.164 |
| 23° | 165 | 1.51 | 141 | 1.29 | 1.19 | 0.148 |
| 24° | 149 | 1.36 | 127 | 1.16 | 1.00 | 0.124 |
| 25° | 135 | 1.24 | 115 | 1.05 | 0.91 | 0.113 |
| 26° | 117 | 1.07 | 100 | 0.92 | 0.69 | 0.086 |
| 27° | 104 | 0.95 | 089 | 0.82 | 0.56 | 0.069 |
| 28° | 99 | 0.91 | 085 | 0.78 | 0.50 | 0.062 |
| 29° | 88 | 0.81 | 075 | 0.69 | 0.41 | 0.051 |
| 30° | 73 | 0.67 | 062 | 0.57 | 0.32 | 0.040 |

According to the above test results, it is confirmed that the angle of extension of outward end of the drag-type blade being extended from the semicircle increases the power coefficient (Cp) by 10.6% at 30° extension compared to 0° from the center point of the semicircle (θ). And, when Y axis spacing (a) between semicircles of drag-type blades are set between −5/110 (−0.05) to 1/5 (0.25), the power coefficient (Cp) is found to be more efficient at 0.210 or higher, and in addition, the power coefficient (Cp) of the drag-type blade's overlap ratio in the overlapping regions is found to be higher than 0.164 between 5% to 34%. Especially, when there is no overlap in the overlap ratio of 25% of overlapping regions, it can be seen that the power coefficient (Cp) increases by 44.0% than the overlap ratio of 0. And, for the airfoil-type blade, the power coefficient (Cp) is higher than 0.179 between 17.5% the implementation Example 2 32.5% of the blade thickness ratio and when the angle of attack of airfoil-type blade was 3° and 19°, it can be seen that the power coefficient (Cp) was higher than 0.190.

If the wind energy electricity generator for low wind velocity is productized by combining each outcome obtained from the power coefficient (Cp, efficiency) of the highest values of the five geometrical parameters, higher power coefficient (Cp, efficiency) can be achieved from the test than the test results from the scaled model.

Also, if the tip speed ratio of drag-type blade becomes 1.0, the moment that rotate the blades higher than such figure cannot be generated. Therefore, as shown in following Table 9, it was configured so that when the diameter (Id) of the drag-type blade is made between 20% to 46% of the total diameter of the blade (Td), even if the tip speed ratio of the airfoil-type blade reaches the maximum of 5.0, the airfoil-type blade will not interfere with the rotational power because the tip speed ratio of the drag-type blade was set to 1.0.

TABLE 9

| Drag-Type Blade Diameter (Id)/ Total Blade Diameter (Td) | The maximum tip speed ratio of the airfoil-type blade when the tip speed ratio of the drag-type blade is 1. |
|---|---|
| 1~14% | 1/0.10 = 10.00~1/0.14 = 7.143 |
| 15% | 1/0.15 = 6.667 |
| 16% | 1/0.16 = 6.250 |
| 17% | 1/0.17 = 5.882 |
| 18% | 1/0.18 = 5.556 |
| 19% | 1/0.19 = 5.263 |
| 20% | 1/0.20 = 5.000 |
| 21% | 1/0.21 = 4.762 |
| 22% | 1/0.22 = 4.545 |
| 23% | 1/0.23 = 4.348 |
| 24% | 1/0.24 = 4.167 |
| 25% | 1/0.25 = 4.000 |
| 26% | 1/0.26 = 3.846 |
| 27% | 1/0.27 = 3.703 |
| 28% | 1/0.28 = 3.571 |
| 29% | 1/0.29 = 3.448 |
| 30% | 1/0.30 = 3.333 |
| 31% | 1/0.31 = 3.226 |
| 32% | 1/0.32 = 3.125 |
| 33% | 1/0.33 = 3.030 |

TABLE 9-continued

| Drag-Type Blade Diameter (Id)/ Total Blade Diameter (Td) | The maximum tip speed ratio of the airfoil-type blade when the tip speed ratio of the drag-type blade is 1. |
|---|---|
| 34% | 1/0.34 = 2.941 |
| 35% | 1/0.35 = 2.857 |
| 36% | 1/0.36 = 2.778 |
| 37% | 1/0.37 = 2.703 |
| 38% | 1/0.38 = 2.632 |
| 39% | 1/0.39 = 2.564 |
| 40% | 1/0.40 = 2.500 |
| 41% | 1/0.41 = 2.439 |
| 42% | 1/0.42 = 2.381 |
| 43% | 1/0.43 = 2.326 |
| 44% | 1/0.44 = 2.273 |
| 45% | 1/0.45 = 2.222 |
| 46% | 1/0.46 = 2.174 |
| 47% | 1/0.47 = 2.128 |
| 48% | 1/0.48 = 2.083 |
| 49% | 1/0.49 = 2.041 |
| 50% | 1/0.50 = 2.000 |
| 51% | 1/0.51 = 1.961 |
| 52% | 1/0.52 = 1.923 |
| 53% | 1/0.53 = 1.887 |
| 54% | 1/0.54 = 1.852 |
| 55% | 1/0.55 = 1.818 |
| 56~99% | 1/0.56 = 1.786~1/0.99 = 1.010 |

For example, in case of the total diameter of the blade (Td) being 4 m at the wind velocity of 12 m/sec, the diameter of the drag-type blade (Id) is 0.8 m when the diameter of the drag-type blade (Id) is 20% of the total diameter of the blade, and when the calculation of the rpm at the tip speed ratio of 1.0 for the drag-type blade is substituted to the above [formula 1] it becomes 286 rpm, and the tip speed ratio of the airfoil-type blade having the diameter (Td) of 4 m located at the end also becomes 286 rpm at 5.0. In other words, when the diameter of the drag-type blade (Id) is 20% of the total diameter of the blade (Td), the rotation of the drag-type blade becomes 286 rpm and the rotation of airfoil-type blade also becomes 286 rpm when the tip speed ratio of the airfoil-type blade is 5.0 so until the tip speed ratio of the airfoil-type blade reaches 5.0, no interference is made to the rotation by the drag-type blade.

The characteristics of the invention according the above test results are summarized as follows: The diameter of the drag-type blade (Id) is set between 20% and 46% of the total blade diameter (Td). It has efficient characteristics in that although the outward end of the above drag-type blade is extended from the semicircle, the angle of extension (θ) is extended between 3° to 35° from the center point of the semicircle. In addition, it has efficient characteristics in that the Y axis spacing between semicircles for the above drag-type blades are set between −5/110 to 1/5 spacing of the semicircle's diameter of the drag-type blade.

In addition, the overlap ratio of overlapping regions of the above drag-type blade is divided into two cases; the case of the central axis of the central shaft being configured with a shaft and the case where the central axis is supported by the drag-type blade without a shaft. As shown in FIG. 2 (a), when the central axis is formed with a shaft, the overlap ratio of overlapping regions is calculated by dividing the value obtained from subtracting the shaft diameter (e') of the central axis from X axis spacing (e) overlapping between semicircles by the semicircle's diameter (d) where it is preferable to be made between 5% to 34%, and in case of the central axis being formed without a shaft due to the support from the drag-type blades as shown in FIG. 2 (b), the overlap ratio of overlapping regions is calculated by dividing X axis spacing (e) overlapped between semicircles by the semicircle's diameter (d) and it is preferable to be made between 5% to 34%.

In other words, the overlap ratio of overlapping regions is the same as shown in FIG. 2 (b) when the diameter (e') of the shaft of the central axis is 0 (zero) as shown in FIG. 2 (a). When the overlap ratio of overlapping regions of the wind that passes through the drag-type blade (123) and the drag-type blade (124) is made between 5% to 34%, the power coefficient (Cp) becomes higher than 0.162, and in the case where there is no overlap in the 25% of overlapping ratio, it can be seen that the power coefficient (Cp) increases by 44.0% than the overlap ratio of 0.

In addition, in order to maximize the rotational speed, the above airfoil-type blade is formed having the wing thickness ratio of 17.5% to 32.5% by dividing the thickness of the blade (wing) to the chord line length and it has the efficient characteristics in that the angle of attack of the above airfoil-type blade is set between 3° to 19°.

In addition, the above airfoil-type blade is equipped with two blades and it can be firmly supported when it is equipped with the cover plate that covers the upper and the lower part of the above drag-type blade. It has the characteristics of being equipped to rotate uniformly with the drag-type blade by being connected to the above cover plate in certain intervals.

The outer peripheral surface support fixture of the drag-type blades (131) requires a certain thickness for firm support. The cross-section of the blade is formed in an air foil shape to prevent any interference to the blade caused by the thickness of the support fixture (131) and has the characteristics of providing help of increasing the tip speed ratio while avoiding the interference with the rotational power.

Here, the implementation example 1 (FIG. 1) shows the characteristic that the above drag-type blade and the airfoil-type blade are formed in vertical shape parallel to the above central shaft.

In addition, the implementation Example 2 (FIG. 8) shows the characteristics that the above drag-type blades form multi stages of large unit blocks to the longitudinal direction and the large unit blocks are formed in the shape of being twisted by 60° to 180° angle against neighboring large unit blocks (a,b,c and d) while the above airfoil-type blades are formed in vertical shape parallel to the above central shaft.

In addition, the Implementation Example 3 (FIG. 11) shows the characteristics that the above drag-type blades form multi stages of small unit blocks and each of small unit blocks are formed in the shape of being twisted between the range of 1° to 19° of certain angles against neighboring small unit blocks (a,b,c,d,e,f . . . ) while the above airfoil-type blades are formed in vertical shape parallel to the above central shaft.

In addition, the implementation Example 4 (FIG. 12) shows the characteristics that the above drag-type blades form multi stages of large unit blocks to the longitudinal direction and the large unit blocks are formed in the shape of being twisted by 60° to 180° angle against neighboring large unit blocks (a,b,c and d) while the above airfoil-type blades form multi stages of small unit blocks to the longitudinal direction and each of small unit blocks are formed in the shape of being twisted by 1° to 19° angle against neighboring small unit blocks (a,b,c,d,e,f . . . )

In addition, the implementation Example 5 (FIG. 13) shows the characteristics that the above drag-type blades and the above airfoil-type blades respectively form multi stages of small unit blocks and each of small unit blocks are formed in the shape of being twisted between the range of 1° to 19° of certain angles against neighboring small unit blocks (a,b,c,d, e,f . . . ).

The above drag-type blades and airfoil-type blades can be manufactured with transparent materials. Configuring the LEDs to be installed inside of transparent materials or outside of opaque materials would be preferable for advertisement or landmark effects.

The wind power generation device for low wind velocity has the characteristics of being able to be installed at any angle on a vertical, horizontal or sloped location. Especially, the top of a building is a suitable location for the horizontal installation with unlimited installations and expansions of module units as shown in FIG. 14 (d) and has the advantages of cost saving and post management by lowering the height of the tower.

The wind power generation device for low wind velocity according to the other viewpoint of this invention is characterized as being available to generate power even in any place with less wind by increasing the efficiency of rotational power by improving the moment of rotation of the blade and maximizing the tip speed ratio immediately after the start of rotation of the blades. This invention includes the central shaft producing the rotational power by being supported in a rotatable condition and formed in a shape of a long cylindrical pole; the coupling part of the axle having the prolate groove at the cover plate being combined with the above central shaft is formed on the center, The drag-type blade in the shape of semicircular ring which is placed and fixed in the same rotational direction by forming the overlap ratio of overlapping regions based on the coupling part of the axle in order to increase the moment of rotation and the airfoil-type blade unit that maximizes the tip speed ratio connected by the support fixture (131) on the outer peripheral surface of the above drag-type blade unit forms the segment of small unit blocks and the blades stacked with above segments; and the generation module located on the extension line of the central shaft generates power by receiving the rotational driving force from the central shaft.

Here, the segment is characterized by being formed in the shape of twisted form between the range of 1° to 19° of certain angles against neighboring segments or as the vertical standing form.

And, for the drag-type blade unit, the diameter is made between 20% to 46% of the total diameter of the blade (Td) and the outward end extends from the semicircle with the extension angle (θ) set between 3° to 35° from the center of the semicircle and the Y axis spacing between semicircles are set between −5/110 to 1/5 spacing of the semicircle's diameter of the drag-type blade.

In addition, the overlap ratio of overlapping regions of the above drag-type blade is divided into two cases; the case of the central axis of the central shaft being configured with a shaft and the case where the central axis is supported by the drag-type blade without a shaft. As shown in FIG. 2 (a), when the central axis is formed with a shaft, the overlap ratio of overlapping regions is calculated by dividing the value obtained from subtracting the shaft diameter (e') of the central axis from X axis spacing (e) overlapping between semicircles by the semicircle's diameter (d) where it is preferable to be made between 5% to 34%, and in case of the central axis being formed without a shaft due to the support from the drag-type blades as shown in FIG. 2 (b), the overlap ratio of overlapping regions is calculated by dividing X axis spacing (e) overlapped between semicircles by the semicircle's diameter (d) and it is preferable to be made between 5% to 34%.

In other words, the overlap ratio of overlapping regions is the same as shown in FIG. 2 (b) when the diameter (e') of the shaft of the central axis is 0 (zero) and the overlap ratio of overlapping regions of the wind that passes through the drag-type blade (123) and the drag-type blade (124) should be made between 5% to 34%.

And, the thickness ratio of the above airfoil-type blade is set between 17.5% to 32.5% and its angle of attack is set between 3° to 19°.

In addition, the above support fixture (131) is characterized by having the form of airfoil for its cross-section.

The wind power generation devices for low wind velocity according to this invention includes: the drag-type blade in a semicircular ring shape that is placed and fixed at the same rotational direction by forming the overlap ratio of overlapping regions; a multiple number of the wind power generation devices for low wind velocity configured as specified in anyone of the Item 1 through Item 16 which includes airfoil-type blades that maximizes the tip speed ratio by being connected to the outer peripheral surface of the drag-type blade; the central control center that remotely controls and monitors the status of fault and the operation of the wind power generation device for low wind velocity; the control unit that controls the movement of wind power generation device for low wind velocity according to the instruction of the central control center and reporting the status of wind power generation device for low wind velocity to the central control center; and the battery cell that stores the electric energy generated by the wind power generation device for low wind velocity and regenerating them into electricity when necessary.

Here, in the case where the drag-type blade and the airfoil-type blade is formed in segments where stacks are formed erected or twisted, the drive unit that can change the angle of segment in the center of the segment and the sensor that can detect the twisted angle between the segments are equipped in the wind power generation device for low wind velocity, and the above control unit controls the drive of the drive unit of the segment according to the angle of segment transmitted from the central control center and changes the overall blade formation from erected to twisted form or vice versa.

Effect of the Invention

According to this invention, the wind power generation device for low wind velocity is characterized by having the structure of being entirely erected or twisted with the adoption of the drag-type blade in the inner side and has large starting torque that rotates the blade of the wind power generator from a stopped position, and it can reach the tip speed ratio of 1 between a fastest time by improving the attack characteristics that strengthens the maneuvering moment, and by increasing the rotational acceleration to more than 1 tip speed ratio by adopting the airfoil-type blade in the outer side, the device effectively generates the wind power by creating the rotational power even with a small amount of wind regardless of the direction of the wind, and it is economical by being able to be installed at low cost regardless of location or position and has the effect of begin able to perform a highly effective wind power generation while being eco-friendly.

In addition, compared to propeller type wind power generators, this device has the shorter rotation radius of the blades with lower noise level and does not requires a high-tech system or device, thus it can maximize the power generation amount by being able to install many number of wind power generators with the same investment cost as the conventional ways, and it can accurately and quickly establish the future developmental directions of the wind power generation for the countries with low wind velocity, and it has the effect of creating economical and substantial green energy.

SIMPLE DESCRIPTIONS OF THE DRAWINGS

FIG. 2 is the drawing for describing the overlap ratio of overlapping regions of drag-type blades in the wind power generation device for low wind velocity according to this invention.

Figure 4:
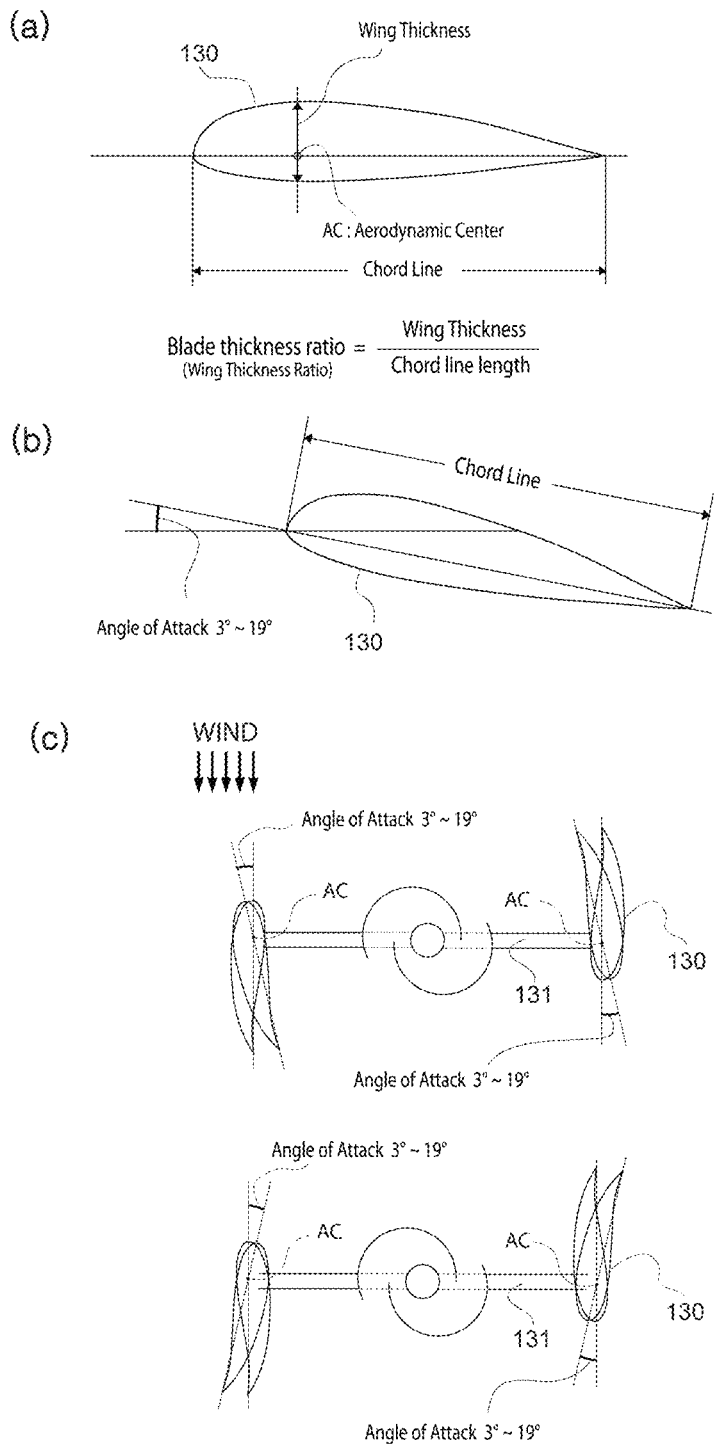

FIG. 4 (a)~(c) are the drawings for describing the thickness ratio of the airfoil-type blade and the degree of angle of attack in the wind power generation device for low wind velocity according to this invention.

Figure 5:
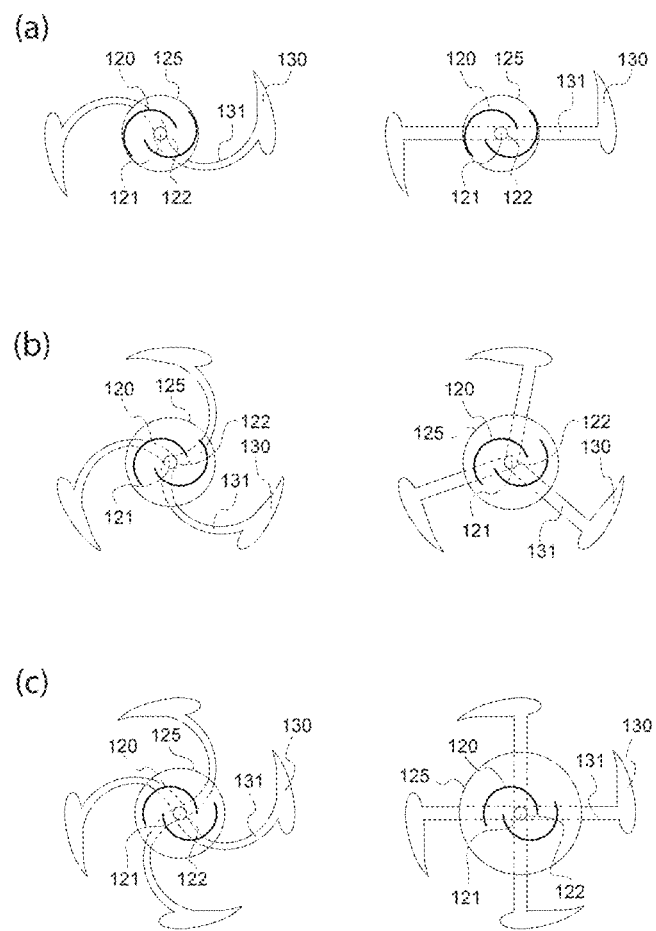

FIG. 5 is the drawing that illustrates the airfoil-type blades being equipped in multiple sets in the wind power generation device for low wind velocity according to this invention.

Figure 6:
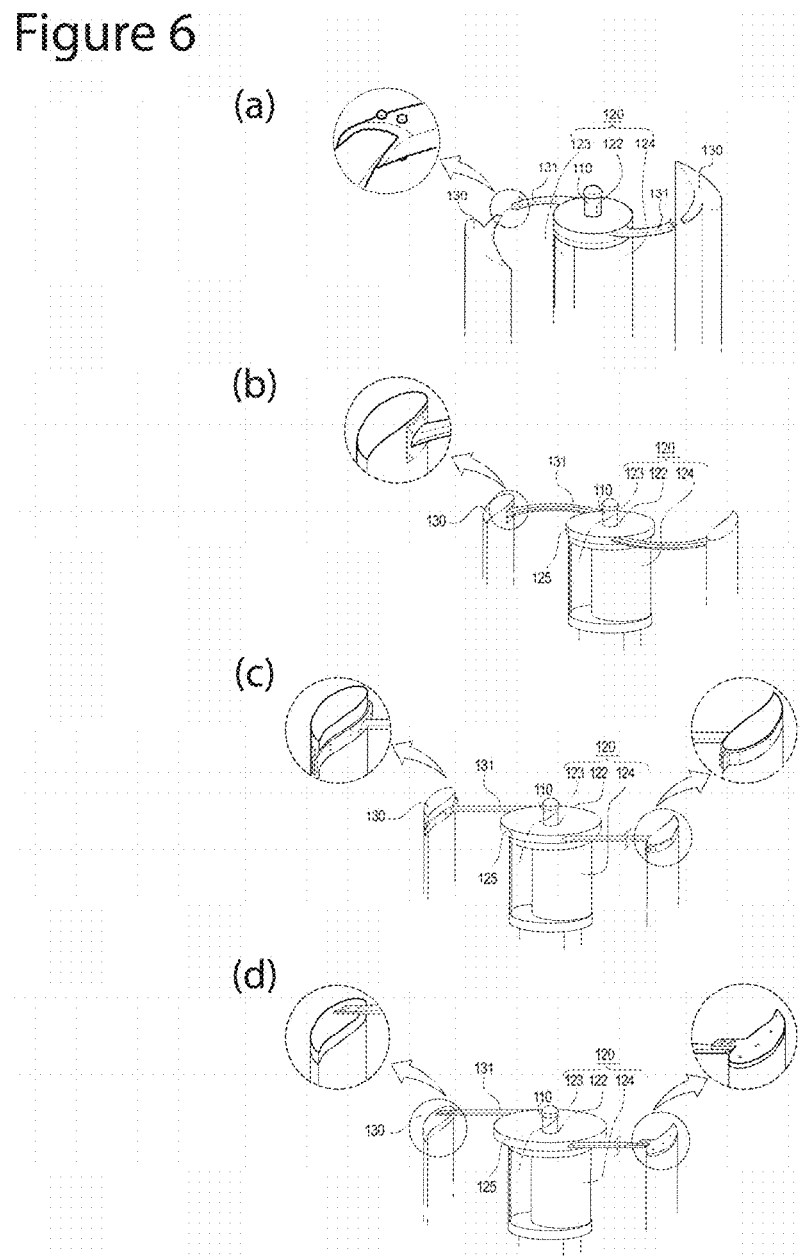

FIG. 6 is the drawing that illustrates examples of installation and removal of airfoil-type blade on the support fixture in the wind power generation device for low wind velocity according to this invention blade.

Figure 7:
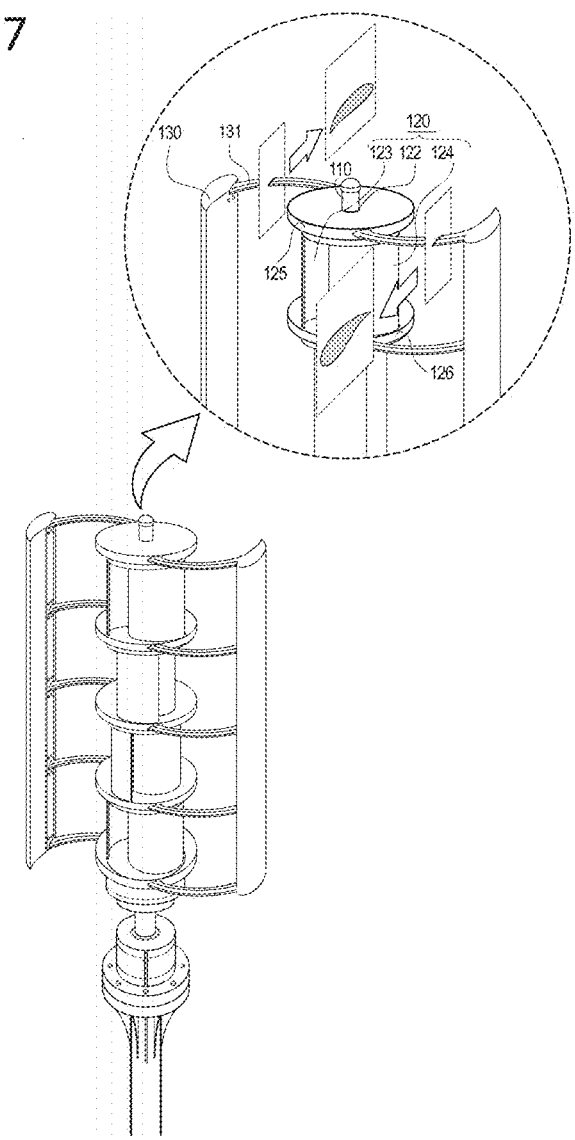

FIG. 7 is the drawing that illustrates the support fixture being composed in the form of airfoil in the wind power generation device for low wind velocity according to this invention support.

Figure 8:
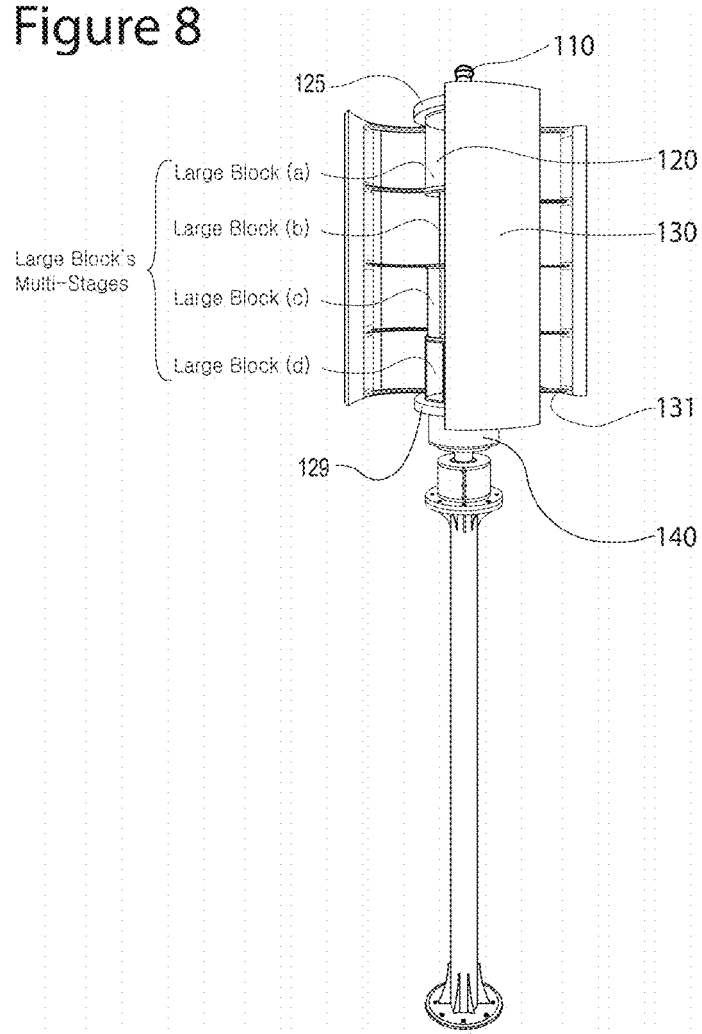

FIG. 8 is the front view illustrating the Implementation Example 2 of the wind power generation device for low wind velocity according to one viewpoint of this invention.

Figure 9:
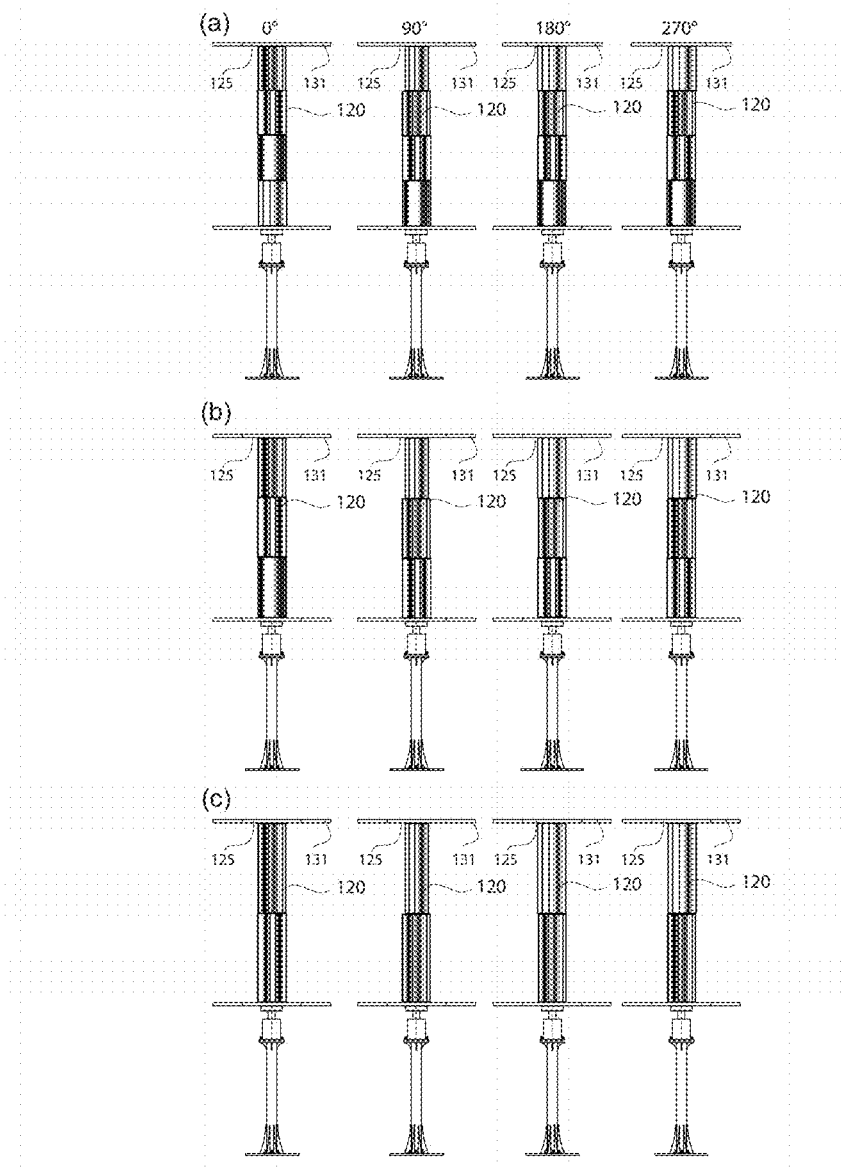

FIG. 9 (a) is the drawing that illustrates the views from 0°, 90°, 180° and 270° angles on the drag-type blades (4 large block stages) of the wind power generation device for low wind velocity in FIG. 8.

FIGS. 9 (b) and (c) are drawings that describe the views seen from 0°, 90°, 180° and 270° angles on the drag-type blades formed in 3 and 2 large block stages.

Figure 10:
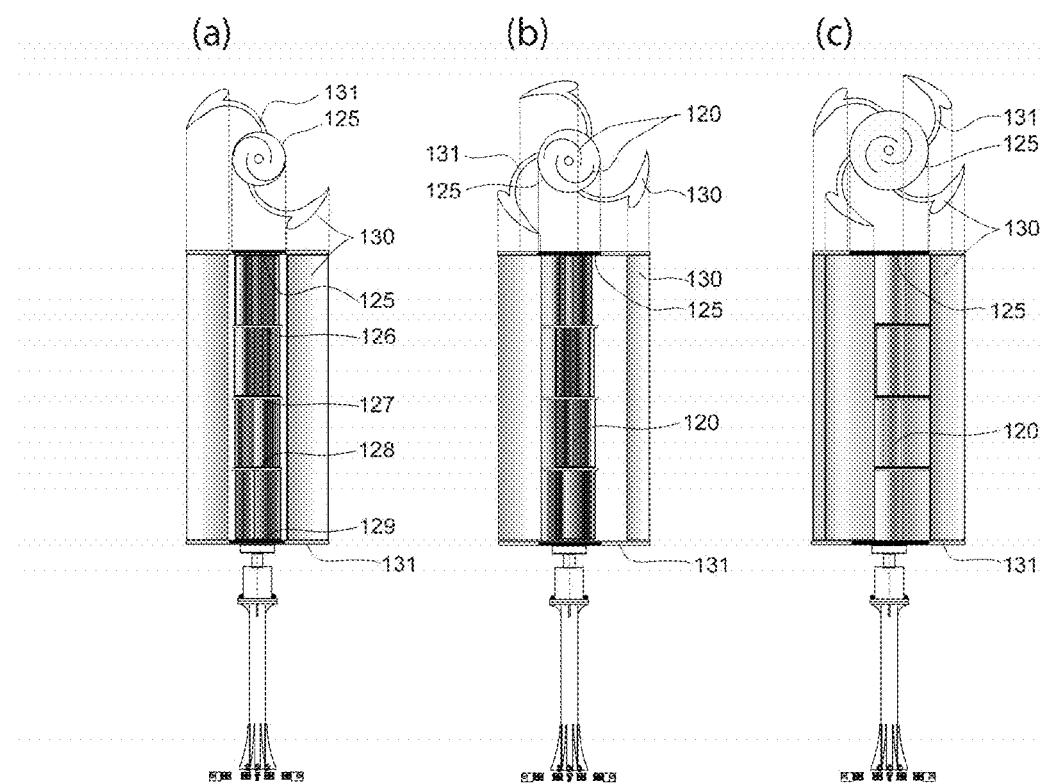

FIG. 10 (a)~(c) are drawings that illustrate the airfoil-type blades being equipped in multiple sets (2 each, 3 each and 4 each) in the Implementation Example 2 of FIG. 8.

Figure 11:
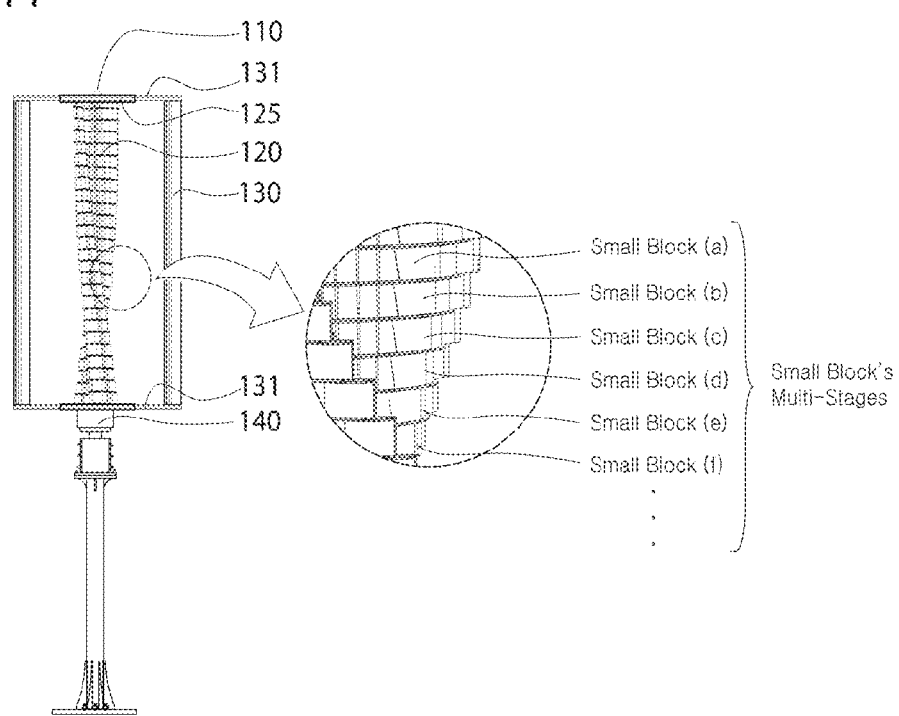

FIG. 11 is the front view illustrating the Implementation Example 3 of the wind power generation device for low wind velocity according to one viewpoint of this invention.

Figure 12:
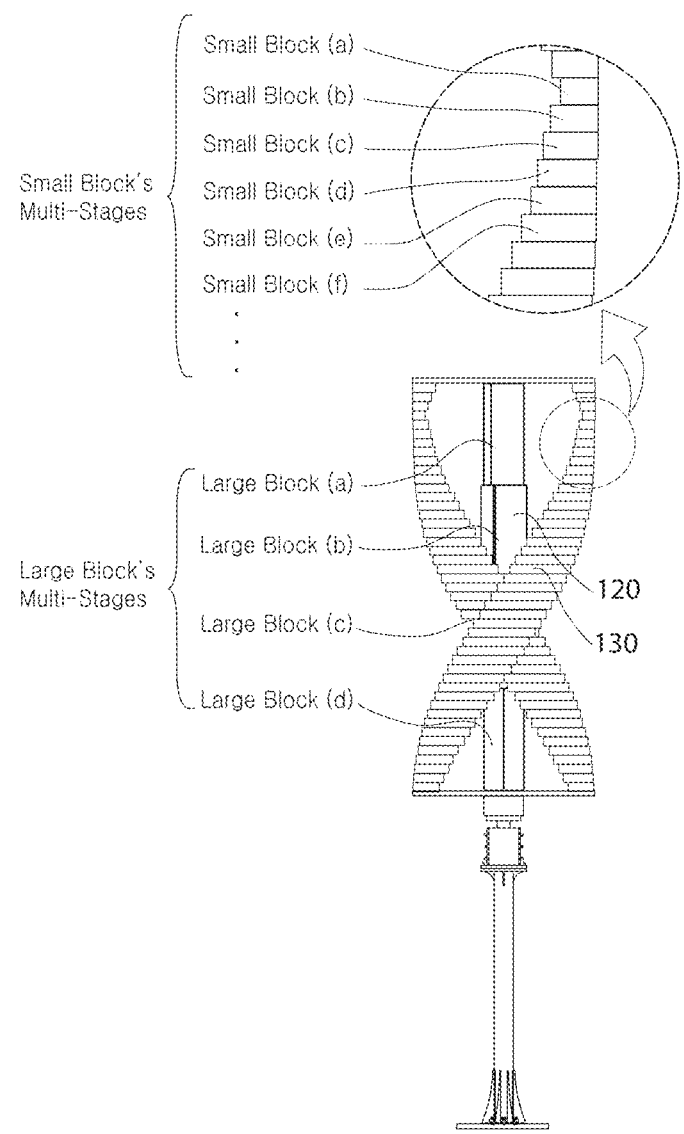

FIG. 12 is the front view illustrating the Implementation Example 4 of the wind power generation device for low wind velocity according to one viewpoint of this invention.

Figure 13:
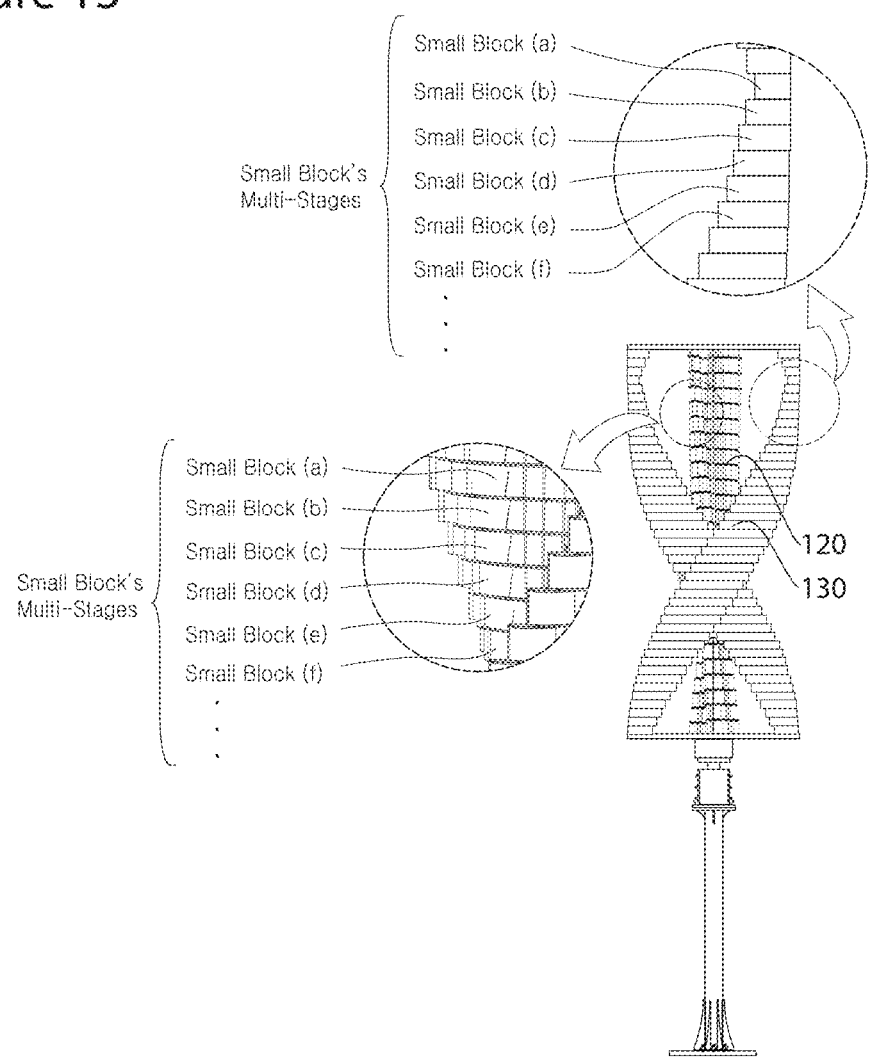

FIG. 13 is the front view illustrating the Implementation Example 5 of the wind power generation device for low wind velocity according to one viewpoint of this invention.

FIGS. 14(a)-14(e) are drawings that illustrate the horizontal installations of implementation examples of the wind power generation device for low wind velocity according to one viewpoint of the invention.

FIGS. 15(a)-15(k) are drawings that illustrate the vertical installations of implementation examples of the wind power generation device for low wind velocity according to one viewpoint of the invention.

FIGS. 16(a)-16(b) are drawings that illustrate the sloped installations of implementation examples of the wind power generation device for low wind velocity according to one viewpoint of the invention.

FIG. 17 is the drawing that illustrates the wind direction and effect in the wind power generation device for low wind velocity according to one viewpoint of this invention.

Figure 18:
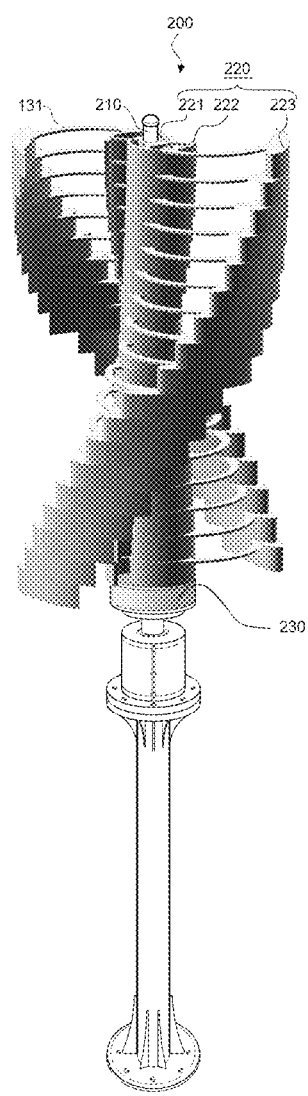

FIG. 18 is describing the wind power generation device for low wind velocity according to the other viewpoint of this invention.

Figure 19:
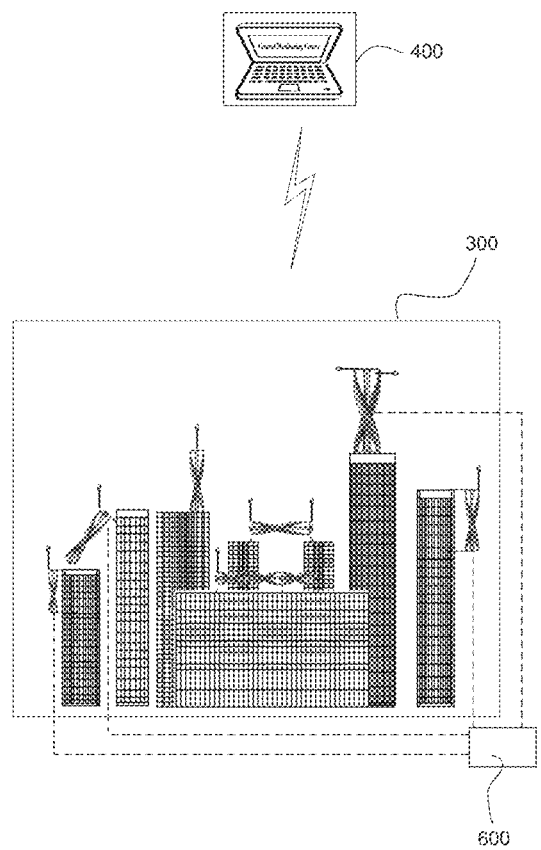

FIG. 19 is the drawing for outlining the composition of low velocity wind power generation system according to this invention.

Figure 20:
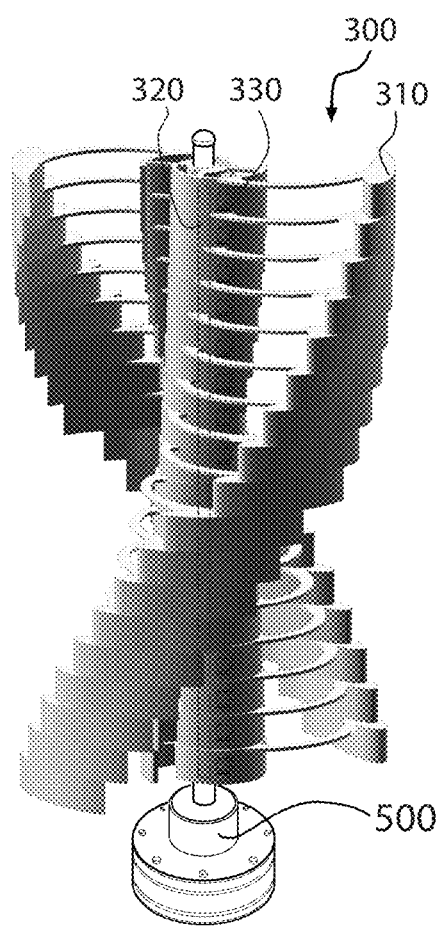

FIG. 20 is the drawing for illustrating the segment drive unit and sensor in the low velocity wind power generation system of FIG. 19.

PREFERRED EMBODIMENT OF THE INVENTION

The above goals, characteristics and other advantages of this invention will be more apparent by explaining the preferable implementation examples referencing the attached drawings. By referring to attached drawings, the wind power generation device for low wind velocity of this invention and the low velocity wind power generation system using this device is described in detail. For the purpose of this statement, the same reference numbers on drawings represent the same components unless specified otherwise.

Figure 1:
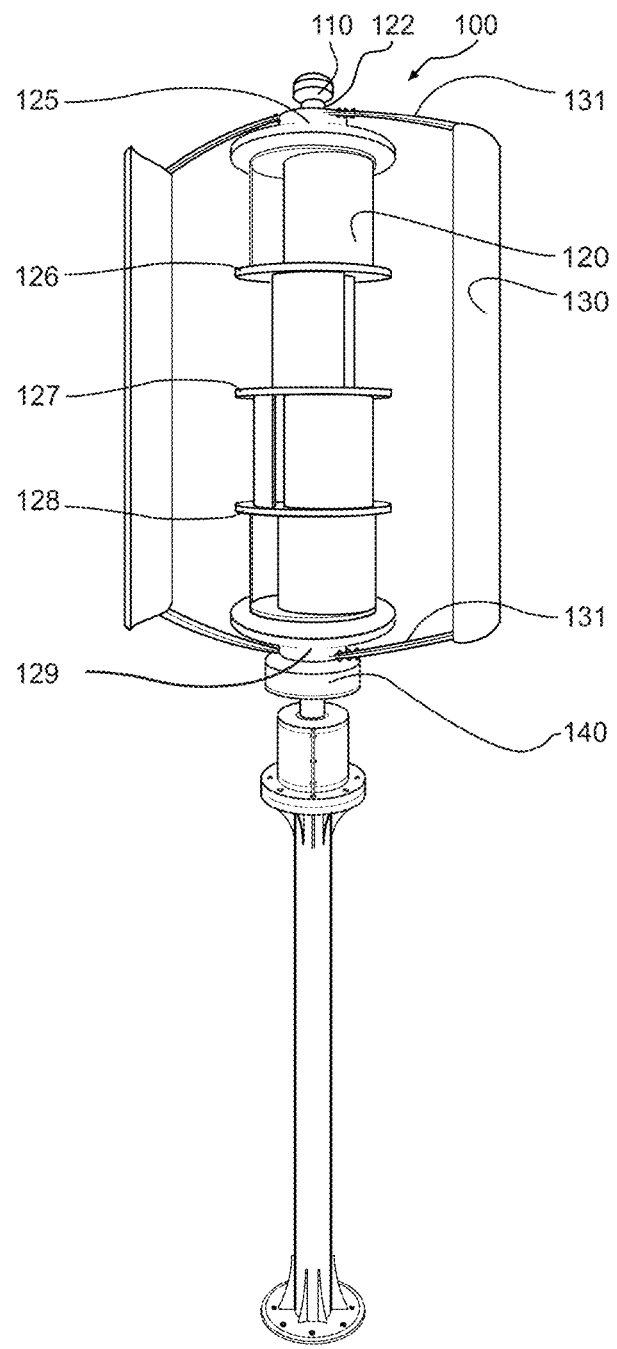
FIG. 1 is illustrating the Implementation Example 1 of the wind power generation device for low wind velocity according to one viewpoint of this invention.
Figure 3:
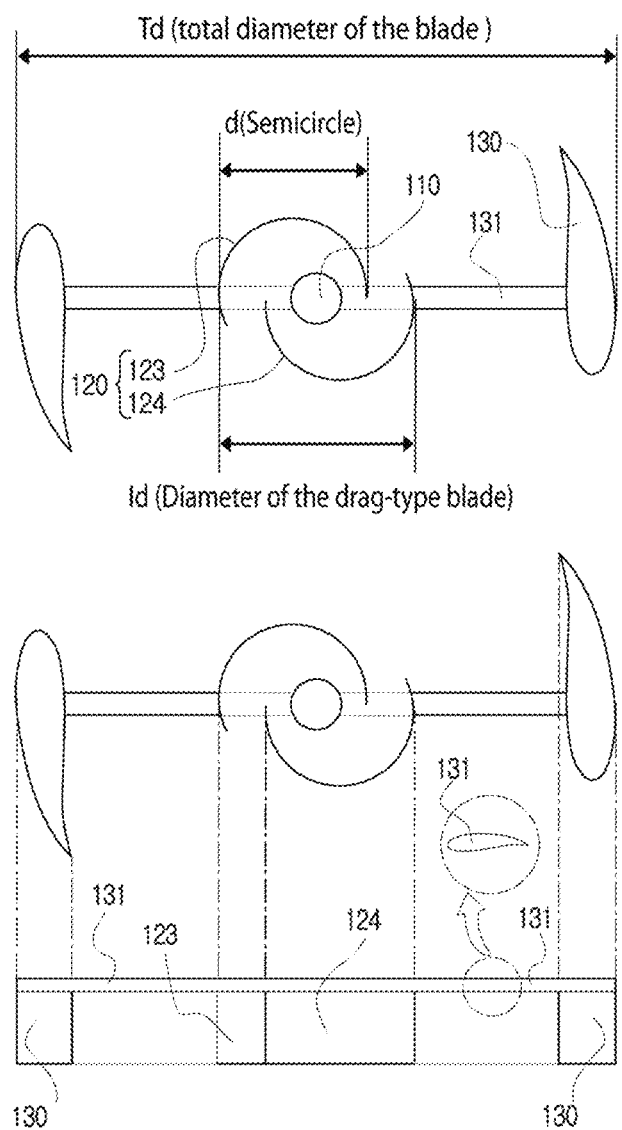
FIG. 3 is the drawing for describing the diameter of drag-type blade in the wind power generation device for low wind velocity according to this invention.
Figure 15:
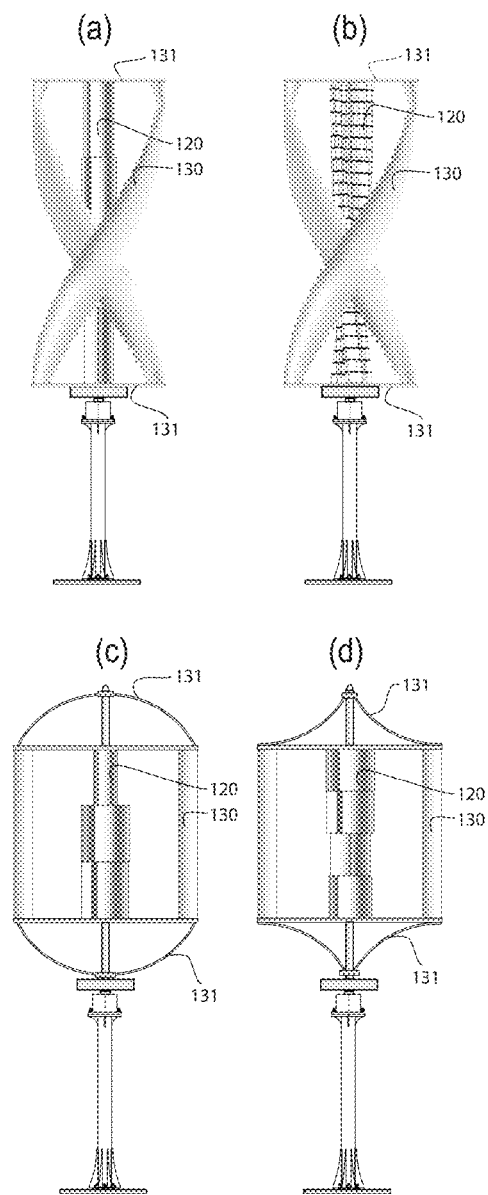
Figure 15:
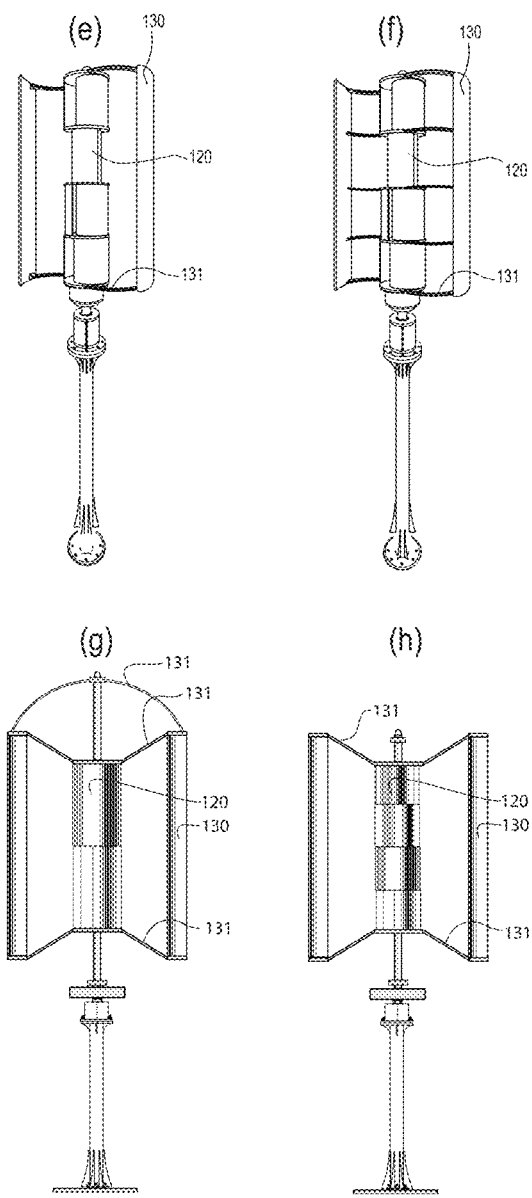
Figure 15:
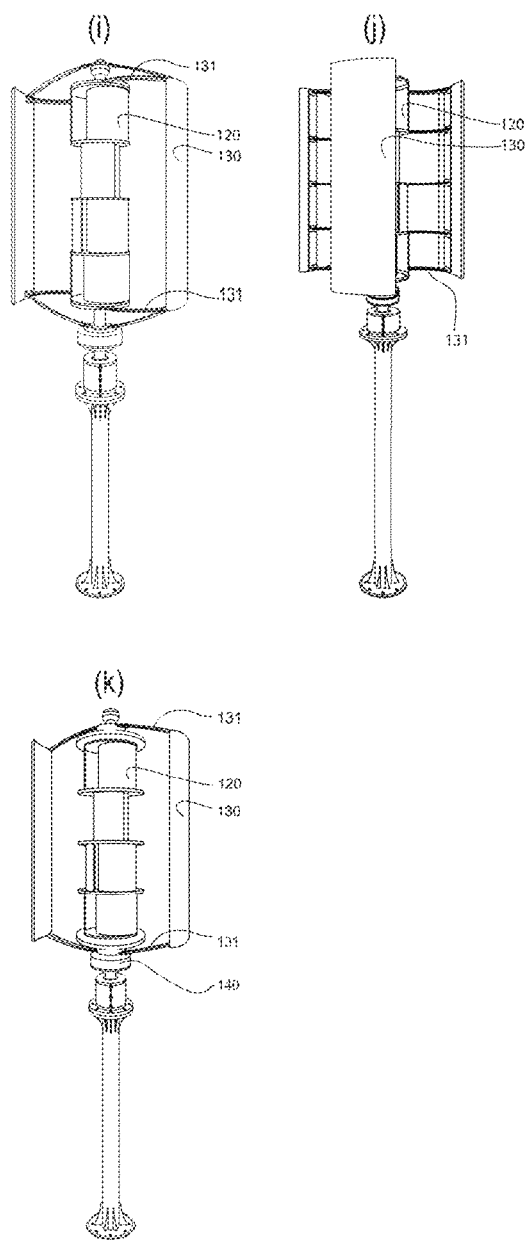

FIG. 1 is illustrating the Implementation Example 1 of the wind power generation device for low wind velocity according to one viewpoint of this invention. FIG. 2 is the drawing for describing the overlap ratio of overlapping regions of the drag-type blades for the case of the central axis of the center axle being configured with a shaft and the case where the central axis is supported by the drag-type blade without a shaft. FIG. 3 is the drawing for describing the diameter (Id) of the drag-type blade and the diameter (Td) of the airfoil-type blade. FIG. 4 is the drawing for describing the angle of attack of the airfoil-type blade and the thickness ratio of the blade. The wind power generation device for low wind velocity (100) from one viewpoint includes the central shaft (110), the drag-type blades (120), the airfoil-type blades (130) and the generation module (140) as illustrated in FIG. 1 and FIG. 15.

First, as illustrated in FIG. 1, the central shaft (110) is divided into two cases where the central axis is configured with a shaft and without a shaft as the central axis is supported by the drag-type blade. And the central shaft is installed to be rotatable to generate the rotational power for the power generation of the wind power generation device. In addition, since the configuration is directly affected by the rotational power from the generation or external wind, the central shaft should be installed firmly to avoid any fluctuation or danger from the velocity change of external wind or rotation.

The drag-type blades (120) has the axle connection part (122) in the center point with the prolate groove (121) which connects to the central shaft (110). To generate additional moment of rotation, a pair of drag blades (123,124) in a semicircle shape is placed and fixed in the same rotational direction by creating the overlap ratio of overlapping regions based on the axle connection part (122). To explain the FIG. 2 in more detail, one end of the drag blade (123) is spaced in a certain separation distance from one side of the axle connection part (122) while the other end of the blade is installed toward the other side of the axle connection part (122). And one end of the other drag blade (124) is spaced in a certain separation distance from the other side of the axle connection part (122) while the other end is placed toward the one end of the axle connection part (122). Therefore, one end of the pair of drag blades (123,124) is placed and fixed to have the overlapping regions where the overlapping occurs based on the axle connection part (122).

Here, the overlap ratio of overlapping regions of drag-type blades (120) are formed by subtracting the diameter of shaft (e') of the central axis from the X axis (e) spacing overlapped between the semicircles and dividing the resulting value with the semicircular diameter (d) when the central axis which is the central shaft as shown in FIG. 2(a) is configured with a shaft where it is preferable to be made between 5% to 34%, and, and the overlap ratio of overlapping regions is formed by dividing the X axis spacing (e) overlapped between the semicircles with the semicircular diameter (d) when the central axis is supported by the drag-type blade without a shaft as seen in FIG. 2(b), where it is preferable to be made between 5% to 34%.

In other words, in FIG. 2 (a), when the central axis' shaft diameter (e') is 0 (zero), the overlap ratio of overlapping regions is the same as the overlap ratio of the FIG. 2 (b) and it is preferable to set the overlap ratio of the wind passing the drag blade (123) and the drag blade (124) to be made between 5% to 34%.

And, for the drag-type blades (120), the outward end is extended from the semicircle in a certain angles and in this case, the extension angle (θ) is preferable to be extended between 3° to 35°.

In addition, it is preferable to make the Y axis spacing (a) between the semicircles of the drag blade (123, 124) to be −5/110 to 1/5 interval of semicircular diameter (d) in the drag-type blade.

And, as illustrated in FIG. 3, the diameter (Id) of drag-type blades (120) is recommended to be designed to be between 20% to 46% of the total diameter of the blade (Td). In this case, if the tip speed ratio of drag-type blades (120) becomes 1, the moment that can rotate the blade more cannot be produced and causes hindrance to the rotation velocity of airfoil-type blade at the tip speed ratio of 1 or higher so the drag-type blades (120) should be designed smaller than the total diameter of the blade (the diameter to the tip of airfoil).

The drag-type blades (120) designed in such way handles the starting torque for the wind generation. The flat cross-section of the airfoil-type blade (130) has an oval shape on one side and the other side becomes thinner towards the end like the shape of an airplane wing and it is connected to the outer peripheral surface of the drag blade (123, 124) by the support fixture (131).

As illustrated in FIG. 4 (a), the airfoil-type blades (130) should be designed to accommodate the blade thickness ratio (Wing Thickness Ratio) of between 17.5% to 32.5% so that the lift force that makes the wings of an airplane fly is produced to maximize the rotational acceleration. In addition, as illustrated in FIGS. 4 (b) and (c), the angle of tack of airfoil-type blades (130) is recommended to be set between 3° to 19°. In this case, the blade thickness ratio (Wing Thickness Ratio) is set by dividing the thickness of the blade with the length of chord line and the angle of attack is formed by the airfoil's chord line and the airflow.

As illustrated in FIGS. 5 (a), (b) and (c), multiple sets of airfoil-type blades (130) are installed outside of the drag-type blades (120). In case of installing 2 or 3 blades, the rotation torque is lower than installing 4 blades, but, the production cost will be lowered due to the mold injection and in case of installing 4 blades, the total weight of the blades becomes heavier although the rotational torque may increase and when design in twisted structure the production cost may increase, therefore, the design should be performed carefully considering the generation effect from the rotation torque and the return period of the investment (depreciation).

Also, as illustrated in FIGS. 6 (a), (b), (c) and (d), the airfoil-type blades (130) can be installed so that it can be detached and attached to the support fixture (131). If the airfoil-type blade (130) can be detached and attached from the support fixture (131) by being fastened with the bolt, the replacement and the repair become very easy in the case of occurrences of any damage on the airfoil-type blades (130) where only the damaged blade can be easily replaced so that the life cycle of the wind power generation device is increased with savings on the maintenance cost.

At this point, as illustrated in FIG. 7, the support fixture (131) holding the drag-type blades (120) and the airfoil-type blades (130) require a certain thickness for rigid support, but to prevent any hindrance to the rotation of the blade caused by the thickness of the support fixture (131) and to increase the moment of rotation, the support fixture (131) should be in the form of airfoil.

The generation module (140) is located on the extension line of the central shaft (110) and generates the electricity by receiving the rotational driving force of the central shaft (110) so that the module can be considered as a kind of power generator.

The wind power generation device for low wind velocity configured as above, the wind coming from the outside generates the rotational power on the drag-type blades (120) as it passes through the inside of inner drag-type blade (123), and as the wind that passed through the drag-type blade (123) passes through the overlapping regions between the semicircles and the facing drag-type blade (124), it can create additional moment of rotation up to 44% maximum. Then, the airfoil-type blades (130) create the lift force generating the rotational power with the tip speed ratio of 1 or higher.

The above wind power generation device for low wind velocity can be categorized into many implementation examples according to the overall formation.

As illustrated in FIG. 1, the Implementation Example 1 shows the most basic formation of the wind power generation device for low wind velocity made in the vertical standing form where the drag-type blades (120) and the airfoil-type blades (130) is paralleled to the central shaft (110).

FIG. 8 is the front view illustrating the Implementation Example 2 of the wind power generation device for low wind velocity according to one viewpoint of this invention. FIG. 9 (a) is the drawing for describing the views on the drag-type blades (4 large block stages) of FIG. 8 seen at 0°, 90°, 180° and 270° angles. FIGS. 9 (b) and (c) are drawings for explaining the views on drag-type blades built in 3 and 2 large block stages at seen at 0°, 90°, 180° and 270° angles. And the FIG. 10 (a)~(c) are drawings that illustrate the airfoil-type blades installed in multiple sets in Implementation Example 2 of FIG. 8.

As illustrated in FIG. 8, the Implementation Example 2 shows that the drag-type blades (120) form units of blocks separated in certain intervals to the longitudinal direction where large unit blocks are equally divided to about 4 units for the length. And such large units of blocks are tilted by the angle of 60° to 180° against neighboring large unit blocks (a,b,c and d).

And the airfoil-type blades (130) are formed in the vertical standing position parallel to the central shaft (110). As illustrated in FIG. 10 (a)~(c), the vertical standing airfoil-type blades (130) can be installed in multiple sets. As illustrated, the airfoil-type blades (130) are installed with cover plates (125,126,127,128,129) that cover the top and the bottom area of the drag-type blades (120) and it is preferable to have the airfoil-type blade to be installed on the cover plate (125, 126, 127, 128, 129) by the support fixture (131) to have the configuration of uniformly rotating with the drag-type blades (120).

FIG. 11 is the front view illustrating the Implementation Example 3 of the wind power generation device for low wind velocity according to one viewpoint of this invention. FIG. 12 is the front view illustrating the Implementation Example 4 of the wind power generation device for low wind velocity according to one viewpoint of this invention. FIG. 13 is the front view illustrating the Implementation Example 5 of the wind power generation device for low wind velocity according to one viewpoint of this invention.

As illustrated in FIG. 11, the Implementation Example 3 shows that the drag-type blades (120) form the multi-stages of small unit blocks to the longitudinal direction and the small unit blocks are formed in twisted form in certain angles between the range of 1° to 19° against neighboring blocks (a, b, c, d, e, f . . . ) while the airfoil-type blades (130) are formed in the vertical standing position parallel to the central shaft (110).

As illustrated in FIG. 12, the Implementation Example 4 shows that the drag-type blades (120) form the multi-stages of large unit blocks to the longitudinal direction identical to Implementation Example 2 where the large unit blocks are formed in twisted shape with the angle of 60° to 180° against neighboring large unit blocks (a, b, c, d), and the airfoil-type blades (130) form the multi-stages of small unit blocks separated by small intervals to the longitudinal direction and the small unit blocks are formed in twisted form in certain angles between the range of 1° to 19° against neighboring blocks (a, b, c, d, e, f . . . ).

In addition, as illustrated in FIG. 13, Implementation Example 5 shows that the drag-type blades (120) and airfoil-type blades (130) form the multi-stages of small unit blocks separated by small intervals to the longitudinal direction and the small unit blocks are formed in twisted form in certain angles between the range of 1° to 19° against neighboring blocks (a, b, c, d, e, f . . . ).

Figure 14:
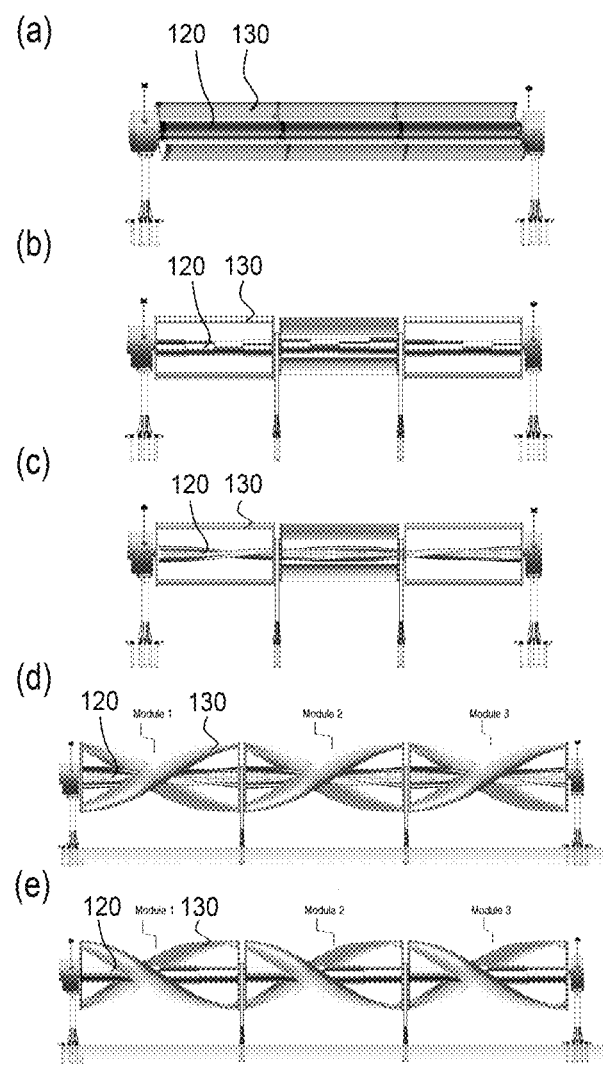
Figure 16:
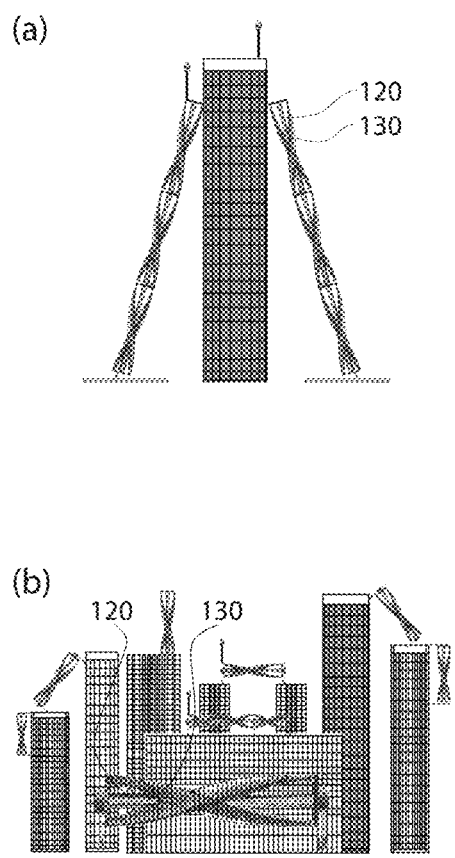

FIG. 14 and FIG. 16 illustrates horizontal, vertical and inclined installations of implementation examples the wind power generation device for low wind velocity according to this invention. FIG. 14 (a)~(e) illustrates horizontal installations of implementation examples 1 and 5 of this invention. FIG. 15 (a)~(k) illustrates vertical installations of representative implementation examples. FIGS. 16 (a) and (b) illustrates inclined installations of implementation examples.

As illustrated, in the wind power generation device for low wind velocity, the blade module configured with the drag-type blades (120) and airfoil-blades (130) can be stacked with one or in multiple, and the blade module stacked with one or in multiple can be installed appropriately according to the installation environment such as vertical, horizontal, inclined angle or other angles, and it is applicable for wherever place that requires the power generation using the wind.

In addition, the drag-type blades (120) and the airfoil-type blades (130) can be manufactured with transparent materials and by installing the LEDs on the inside or the outside of the drag-type blades (120) and the airfoil-type blades (130), it can include the flashing light function which can alert the location of installation during the nighttime or in foggy weather.

As illustrated in FIG. 17, in the wind power generation device for low wind velocity according to one viewpoint, the wind coming from the outside flows through the inside of the drag-type blades (120) formed in erected or twisted shape creates the maximum starting torque and starting force of the drag-type blades (120), and as the wind that passed through the drag-type blade (123) passes through the overlapping regions between the semicircles and the facing drag-type blade (124), it generates additional moment of rotation up to 44% maximum and as the drag-type blades (120) rotate, the lift power is generated on the airfoil-type blades (130) and maximizes the tip speed ratio.

FIG. 18 is for describing the wind power generation device for low wind velocity according to the other viewpoint of this invention.

The wind power generation device for low wind velocity (200) in the other viewpoint includes; the central shaft (210) formed in the shape of a long cylindrical pole and supported in rotatable state producing the rotational power; the coupling part of the axle (221) having the prolate groove (121) at the cover plate (125,126,127,128,129) being combined with the above central shaft (210) is formed on the center; the drag-type blade (222) in the shape of semicircular ring which is placed and fixed in the same rotational direction by forming the overlap ratio of overlapping regions based on the coupling part of the axle (221) in order to increase the moment of rotation; the airfoil-type blade unit (223) forms the segment in small unit blocks that maximizes the tip speed ratio connected by the support fixture (131) on the outer peripheral surface of the above drag-type blade unit (222); the blades (220) installed by stacking the above segments; and the generation module (230) located on the extension from the central shaft (210) that produces electricity by receiving the rotational driving force of the central shaft (210).

The description of one viewpoint for the central shaft (210) and the generation module (230) are the same. Therefore, the descriptions on the central shaft (210) and the generation module (230) will be omitted.

For the blades (220), the drag-type blade unit (222) and airfoil-type blade unit (223) forms the segment in a small unit blocks. In addition, the above segments are formed in erected or twisted forms in certain angles between the range of 1° to 19° against neighboring segments.

Here, the diameter of the drag-type blade unit (222) is set in between 20% to 46% of the total diameter of the blade (Td) and the outward end is extended from the semicircle while the extension angle (A) is extended from the center point of the semicircle in the range of 3° to 35°, and the Y axis spacing (a) between the semicircles are set between −5/110 to 1/5 of the diameter (d) of the semicircle of the drag-type blade unit (222).

The overlap ratio of overlapping regions of the drag-type blade (222) is divided into two cases; the case of the central axis of the central shaft being configured with a shaft and the case where the central axis is supported by the drag-type blade without a shaft. As shown in FIG. 2 (a), when the central axis is formed with a shaft, the overlap ratio of overlapping regions is calculated by dividing the value obtained from subtracting the shaft diameter (e') of the central axis from X axis spacing (e) overlapping between semicircles by the semicircle's diameter (d) where it is preferable to be made between 5% to 34%, and in case of the central axis being formed without a shaft due to the support from the drag-type blades as shown in FIG. 2 (b), the overlap ratio of overlapping regions is calculated by dividing X axis spacing (e) overlapped between semicircles by the semicircle's diameter (d) and it is preferable to be made between 5% to 34%.

In other words, in FIG. 2 (a), when the shaft diameter (e') of the central axis is 0 (zero), the overlap ratio of overlapping regions is the same as the overlapping regions of the FIG. 2 (b) and the overlap ratio of the wind passing the drag blade (123) and the facing drag blade (124) should be equally set between 5% to 34%.

And the airfoil-type blade unit (223) is composed of the blade part in the shape of airfoil and the support fixture (131) that connects the blade part to the drag-type blade unit. Here, it is preferable to have the blade thickness ratio to be set between 17.5% to 32.5% and the angle of attack of the blade to be set between 3° to 19° so that the airfoil-type blade unit (223) produces the lift force that makes the wings of an airplane fly to maximize the rotational acceleration.

Like the above, for the blades (220) having twisted shapes, the wind entering from the outside flows through the inside of the drag-type blade unit (222) and generates the maximum starting torque and the starting force on the drag-type blade unit (222) and while the drag-type blade unit (222) is rotating, the wind passes though the center below and increases the moment of rotation of the drag-type blade unit (222) generating the lift force on the airfoil-type blade unit (223) and maximizes the tip speed ratio.

As such, the wind power generation device for low wind velocity of this invention in overall has vertical or twisted structure and by adopting the drag-type blade for the inside improves the aerodynamic characteristics with a larger starting torque and a stronger moment of rotation for rotating the blades of the wind power generator from stopped position, and by adopting the airfoil-type blade in the outer side, the device effectively generates the wind power by creating the rotational power even with a small amount of wind regardless of the direction of the wind, and it is economical by being able to be installed at low cost regardless of location or position and has the effect of begin able to perform a highly effective wind power generation while being eco-friendly.

FIG. 19 is the drawing that roughly outlines the composition of low velocity wind power generation system according to the wind power generation device for low wind velocity this invention.

FIG. 20 is the drawing for illustrating the segment drive unit and sensor in the low velocity wind power generation system of FIG. 19.

As illustrated in FIG. 19 and FIG. 20, the low velocity wind power generation system according to this invention includes the wind power generation device for low wind velocity (300), the central control center (400), the control unit (500) and the battery cell (600).

In the wind power generation device for low wind velocity (300), among the wind power generation device for low wind velocity (100) according to one viewpoint that includes the drag-type blades in a semicircular ring shape that are placed and fixed in the same rotational direction by forming the overlap ratio of overlapping regions and the airfoil-type blades that maximize the tip speed ratio connected to the outer peripheral surface of the drag-type blades and the wind power generation device for low wind velocity (200) according to the other viewpoint, at least one or more number of the wind power generation devices for low wind velocity will be installed.

Here, in the wind power generation device for low wind velocity (300), the drag-type blades and airfoil-type blades are formed in segments (310) and if segments are created in vertical or twisted formation, the drive unit (320) that can change the angle of the segment and the sensor (330) that can detect the tilting of angle (between angle) is formed in the center of the segment.

The central control center (400) monitors and remotely controls the fault status, the operation status and the movement status of the wind power generation devices for low wind velocity wirelessly. In addition, the central control center (400) transmits the angle of segment to the control unit to change the stacked segments (310) in vertical formation to twisted formation or the stacked segments (310) in twisted formation to vertical formation according to the wind direction.

The control unit (500) is installed in the wind power generation device for low wind velocity (300) and controls the movement of wind power generation device for low wind velocity (300) according to the control instruction from the central control center (400) and reports the status of wind power generation device for low wind velocity (300) to the central control center (400). In addition, the control unit (500) changes the overall blade formation from vertical to twisted formation or vice versa by controlling the drive of the drive unit (320) of the segment according to the angle of segment transmitted from the central control center (400). In other words, when the angle of segment is transmitted from the central control center (400), the control unit (500) changes the angle of each segment (310) by driving the drive unit (320) of each relevant segment and controls the angle of each segment (310) by receiving signals from the sensor (330) that detects the variation in angle of segment (310) and stopping the drive of the drive unit (320).

The battery cell (600) is charged with the electric energy generated by wind power generation device for low wind velocity (300) and supplies the electricity to the drive unit (320), the sensor (330), the control unit (400) and others of the segment when necessary.

As such, the low velocity wind power generation system of this invention includes the central control center (400) that remotely controls multiple number of wind power generation device for low wind velocity (300) wirelessly and monitors the status of multiple number of wind power generation device for low wind velocity (300) in real-time basis taking appropriate actions according to abnormal occurrence and changes the overall blade formation from vertical form to twisted form and vice versa according to the direction of the wind, the device is able to perform a highly efficient wind power generation even with small amounts of wind regardless of the direction of the wind.

This invention is described with the preferable implementation examples at the above. However, this invention is not limited to specific implementation examples described above. In other words, any person having a common knowledge in the appertaining field of technology of this invention can perform multiple modifications and/or corrections on this invention without violating the idea and the scope of the attached patent claim and all of such proper modifications and corrections should be considered as equivalent matters that are included in the scope of this invention.

[Sign Descriptions]

100: the Wind power generation device for low wind velocity from one viewpoint
110: the Central shaft
121: the Prolate Groove
123 and 124: the Drag Blade
130: the Airfoil-Type Blade
140: the Generation Module
200: the Wind power generation device for low wind velocity from the other viewpoint
210: the Central shaft
221: the Axle Connection Part
223: the Airfoil-Type Blade Unit
300: the Wind power generation device for low wind velocity
310: the Segment
330: the Sensor
500: the Control Unit
120: the Drag-Type Blades
122: the Axle Connection Part
125 to 129: the Cover Plate
131: the support fixture
220: the Blade
222: the Drag-Type Blade Unit
230: the Generation Module
320: the Drive Unit
400: the Central Control Center
600: the Battery Cell

THE FORMATION TO PRACTICE THE INVENTION

In the wind power generation device for low wind velocity (300), among the wind power generation device for low wind velocity (100) according to one viewpoint that includes the drag-type blades in a semicircular ring shape that are placed and fixed in the same rotational direction by forming the overlap ratio of overlapping regions and the airfoil-type blades that maximize the tip speed ratio connected to the outer peripheral surface of the drag-type blades and the wind power generation device for low wind velocity (200) according to the other viewpoint, at least one or more number of the wind power generation devices for low wind velocity will be installed.

THE INDUSTRIAL USE POSSIBILITY

This invention, in order to obtain highly efficient wind power generation from the low velocity wind energy, has combined the configuration of the drag-type blade that determines the rotational start of the blade and the configuration of the airfoil-type blade that determines the efficiency (tip speed ratio) of the power coefficient at the same time of starting the rotation, and demonstrated the efficiency range of geometrical parameter which is an important parameter, and based on the test conducted by recombining it as the parameter of highest efficiency, a wind power generation amount from a low velocity wind energy that can be used industrially was verified.

Therefore, this invention has allowed efficient design by referencing the wind direction, and the wind velocity, Reynolds number, the air density, the atmosphere condition and the instant variability which are the qualities of the wind around each area of the world, where it has improved the conversion output of the wind energy and enabled the supply of a constant wind energy 24 hours a day, and by being differentiated from the photovoltaic power generation which requires large installation area and limited to 3~4 hours of generation per day, the invented technology of efficiency on the utilization of the wind energy has a high usability for industrial use.

Especially, the commercialization of this invention has high usability in the industry as a competitive product that can secure the green energy resources since it can obtain more wind power generation amount than the photovoltaic power generation compared to the same capacity in the areas having approximately 5 m/sec wind velocity because the device can easily find the wind energy in high-rise buildings, public residents and hills, etc, by changing the altitude.

What is claimed is:

1. A wind power generation device comprising a cylindrical pole that has a central axis;
    a drag-type blade, the drag-type blade having a central shaft rotatable around the central axis with overlapping regions formed on the central shaft fixed in the same rotational direction with an overlap ratio of the overlapping regions is (e-e')/d in which e' is a diameter of the central shaft, e is a length from X axis spacing overlapped between semicircles and d is a diameter of the semicircle or the drag-type blade without a shaft rotatable around the central axis in a shape of a semicircular ring with an overlap ratio of the overlapping regions of e/d in which e is a length from X axis spacing overlapped between semicircles and d is a diameter of the semicircle;
    an airfoil-type blade connected to an outer peripheral surface of the drag-type blade by a support fixture, said airfoil-type blade maximizes the tip speed ratio by rotating integrally with the drag-type blade;
    a generation module located on an extension line of the central axis and produces electricity by receiving rotational driving force of the central axis;
    wherein the drag-type blade is formed in multi-stages of block units in the longitudinal direction and the airfoil-type blade is formed in a vertical standing position parallel to the central axis.

2. The wind power generation device of claim 1, wherein the multi-stages of block units of the drag-type blade are large unit blocks and the large unit blocks are formed in twisted form between 60° to 180° angle against neighboring large unit blocks.

3. The wind power generation device of claim 1, wherein the multi-stages of block units of the drag-type blade are small unit blocks and the small unit blocks are formed in the shape of being twisted between the range of 1° to 19° of certain angles against neighboring small unit blocks.

4. The wind power generation device of claim 1, wherein a diameter of the drag-type blade is set between 20% to 46% of the total diameter of the blade.

5. The wind power generation device of claim 1, wherein for the drag-type blade, the Y axis spacing between semicircles is set between −5/110 to 1/5 spacing of the semicircle's diameter of the drag-type blade.

6. The wind power generation device of claim 1, wherein the overlap ratio of overlapping regions of the drag-type blade is set between 5% to 34%.

7. The wind power generation device of claim 1, wherein the thickness ratio of the blade for the airfoil-type blade is set between 17.5% to 32.5%.

8. The wind power generation device of claim 1, wherein the angle of attack of the airfoil-type blade is set between 3° to 19°.

9. The wind power generation device of claim 1, wherein the device comprises a plurality of airfoil-type blades.

10. The wind power generation device of claim 1, wherein a cross-section of the support fixture is formed in an airfoil shape.

11. The wind power generation device energy electricity of claim 1, wherein the drag-type blade is formed in vertical standing positions parallel to the central shaft.

12. The wind power generation device of claim 1, wherein the drag-type blade or the airfoil-type blade is installed with LEDs.

13. The wind power generation device of claim 1, wherein the above wind energy electricity generator for low wind velocity is installed in any angles including vertical, horizontal and inclined.

14. A wind power generation device comprising a cylindrical pole that has a central axis;
    a drag-type blade, the drag-type blade having a central shaft rotatable around the central axis with overlapping regions formed on the central shaft fixed in the same rotational direction with an overlap ratio of the overlapping regions is (e-e')/d in which e' is a diameter of the central shaft, e is a length from X axis spacing overlapped between semicircles and d is a diameter of the semicircle or the drag-type blade without a shaft rotatable around the central axis in a shape of a semicircular ring with an overlap ratio of the overlapping regions of e/d in which e is a length from X axis spacing overlapped between semicircles and d is a diameter of the semicircle;
    an airfoil-type blade connected to an outer peripheral surface of the drag-type blade by a support fixture, said airfoil-type blade maximizes the tip speed ratio by rotating integrally with the drag-type blade;
    a generation module located on an extension line of the central axis and produces electricity by receiving rotational driving force of the central axis;
    wherein the drag-type blade and the airfoil-type blade are formed in multi-stages of block units in the longitudinal direction.

15. The wind power generation device of claim 14, wherein the multi-stages of block units of the drag-type blade are large unit blocks to the longitudinal direction and the large unit blocks are formed in twisted form between 60° to 180° angle against neighboring large unit blocks and the multi-stages of the air foil-type blade are small unit blocks in the longitudinal direction and the longitudinal direction and the small unit blocks are formed in the shape of being twisted between the range of 1° to 19° of certain angles against neighboring small unit blocks.

16. The wind power generation device of claim 14, the drag-type blade and the airfoil-type blades are multi-stages of small unit blocks in the longitudinal direction and the small unit blocks are formed in the shape of being twisted between the range of 1° to 19° of certain angles against neighboring small unit blocks.

17. The wind power generation device of claim 14, wherein the overlap ratio of overlapping regions of the drag-type blade is set between 5% to 34%.

18. The wind power generation device of claim 14, wherein the angle of attack of the above airfoil-type blade is set between 3° to 19°.

19. The wind power generation device of claim 14, wherein the drag-type blades or the airfoil-type blade are installed with LEDs.

20. The wind power generation device of claim 14, wherein the device is installed in any angles including vertical, horizontal and inclined.

* * * * *